US007047936B2

(12) United States Patent
Suzuki et al.

(10) Patent No.: US 7,047,936 B2
(45) Date of Patent: May 23, 2006

(54) THROTTLE BODIES AND METHODS OF MANUFACTURING SUCH THROTTLE BODIES

(75) Inventors: Koichi Suzuki, Aichi-ken (JP); Masashi Ozeki, Aichi-ken (JP); Hisashi Kino, Aichi (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 10/995,562

(22) Filed: Nov. 24, 2004

(65) Prior Publication Data

US 2005/0109314 A1 May 26, 2005

(30) Foreign Application Priority Data

Nov. 25, 2003 (JP) ............................. 2003-393833
Nov. 28, 2003 (JP) ............................. 2003-399411

(51) Int. Cl.
*F02D 9/08* (2006.01)
*F16K 1/22* (2006.01)

(52) U.S. Cl. ...................................................... 123/337

(58) Field of Classification Search ................ 123/337; 251/305

See application file for complete search history.

(56) References Cited

U.S. PATENT DOCUMENTS 4,266,753 A * 5/1981 Okada ........................ 251/305
4,273,308 A * 6/1981 Nakai .......................... 251/88
5,081,972 A * 1/1992 Daly et al. .................. 123/337
5,669,350 A * 9/1997 Altmann et al. ............ 123/337
5,741,006 A * 4/1998 Murai et al. ................ 251/305
5,794,591 A * 8/1998 Kalebjian et al. ........... 123/337
6,135,418 A * 10/2000 Hatton ....................... 251/306
6,138,640 A * 10/2000 Asanuma et al. ........... 123/337
6,234,208 B1 * 5/2001 Magdelyns et al. ..... 137/630.14
6,273,119 B1 * 8/2001 Foster et al. ............. 137/15.25
6,352,241 B1 3/2002 Hannewald et al. ........ 251/305
6,390,060 B1 * 5/2002 Schroder .................... 123/337
6,505,643 B1 * 1/2003 Scholten et al. ............ 137/554
6,554,250 B1 * 4/2003 Alves et al. ................ 251/305
6,698,717 B1 * 3/2004 Brookshire et al. ......... 251/305
2002/0117646 A1 * 8/2002 Jessberger et al. .......... 251/305
2004/0079327 A1 * 4/2004 Andoh et al. ............... 123/337
2004/0159815 A1 * 8/2004 Kohlen et al. .............. 251/305
2005/0121640 A1 * 6/2005 Lolli .......................... 251/305

FOREIGN PATENT DOCUMENTS

JP 07269376 10/1995
JP 2001212846 8/2001
JP 2002256898 11/2002
WO 9516854 6/1995
WO WO 03/031856 * 4/2003

* cited by examiner

*Primary Examiner*—Hai Huynh
(74) *Attorney, Agent, or Firm*—Dennison, Schultz, Dougherty & McDonald

(57) ABSTRACT

A throttle body comprising a main body defining a cylindrical intake air channel and including a valve member movable between an open and a fully closed position. The valve seal surface and a contact surface are configured such that the valve seal surface sealingly contacts with the corresponding contact surface when a fully closed position of the valve has been displaced due to contraction of one of the main body and the valve member. The valve seal surface and the contact surface of the valve member in the fully closed position are inclined by an angle. The contact angle of inclination gradually decreases from a first point located on a circumference of the periphery of the valve member resulting from a line perpendicular to an intersection of the central axis and the rotation axis to a second point that is proximate to the rotation axis of the valve member.

22 Claims, 20 Drawing Sheets

THROTTLE BODIES AND METHODS OF MANUFACTURING SUCH THROTTLE BODIES

This application claims priority to Japanese patent application serial numbers 2003-393833 and 2003-399411, the contents of which are incorporated herein by reference.

BACKGROUND OF THE INVENTION

1. Field of the Invention

The present invention relates to throttle bodies that define intake air channels for supplying intake air into engines and that control the flow of the intake air through the intake air channels. The present invention also relates to methods of manufacturing such throttle bodies.

2. Description of the Related Art

Japanese Laid-Open Patent Publication No. 2002-256898 (in particular the fourth embodiment shown in FIGS. 5 and 6) teaches a throttle body that is also called "an intake air control device." The throttle body has a main body and a valve member. The valve member is rotatably mounted within the throttle body in order to open and close an intake air channel defined within the main body. The valve member is made of resin and is molded via an insertion molding process. More specifically, the main body is first inserted into a mold and the valve member is then resin molded within the main body.

In this publication, it is disclosed that the valve member may have a configuration conforming to the configuration of the inner wall of the main body even after the valve member has contracted after the molding process. The reason for this is that during molding the outer peripheral surface of the molded valve member may contact with the inner wall of the main body. As a result, the configuration of the peripheral surface of the molded valve member conforms to the configuration of the inner wall of the main body. However, because the inner wall of the main body has a simple cylindrical configuration, the following problems may occur when the valve member has contracted during the cooling period after molding. The outer surface at the free peripheral edges of the valve member may not adequately contact with the inner wall of the main body when the valve member has contracted. In some cases, the contraction of the valve member produces clearances between the free peripheral edges and the inner wall of the main body. This may result in causing a leakage of intake air when the valve member is in a closed position, which in turn lowers the mileage of fuel during an idle engine operation.

SUMMARY OF THE INVENTION

It is accordingly an object of the present invention to teach improved throttle bodies and methods of manufacturing such throttle bodies that can reduce or eliminate a potential clearance between a valve member and an inner wall of a main body when the valve member is in a fully closed position.

According to one aspect of the present teachings, throttle bodies are taught that have a main body and a valve member. The main body defines an intake air channel. The valve member is rotatably mounted to the main body in order to control the flow of intake air through the intake air channel. At least one valve seal surface is formed on an inner wall of the main body and has a circumferential length. At least one contact surface is formed on the valve member in order to sealably contact with the corresponding valve seal surface when the valve member is in a fully closed position. The valve seal surface and the contact surface are configured such that the valve seal surface sealingly contacts with the corresponding contact surface even if the fully closed position has been displaced due to contraction of one of the main body and the valve member.

Therefore, it is possible to prevent or minimize the potential leakage of intake air between the valve seal surface and the contact surface due to unintentional generation of clearances therebetween. In addition, it is possible to prevent or minimize potential malfunction of the valve member due to the interaction or wedging of the valve member and the valve seal surface.

In another aspect of the present teachings, the intake air channel has a central axis. The valve seal surface and the contact surface of the valve member in a fully closed position are inclined by an angle relative to a first plane extending substantially perpendicular to the central axis of the intake air channel. The angle of inclination of the valve seal surface and the contact surface gradually decreases from a first point that is the most remote from the central axis of the intake air channel (i.e., perpendicular to the central axis of the intake air channel and perpendicular to the rotation axis of the valve member) to at least one second point that is the near to the rotational axis of the valve member. Therefore, the seal between the valve seal surface and the contact surface can be ensured along the relevant circumferential length of the contact surfaces.

The valve seal surface and the contact surface may preferably extend along a linear line as viewed in a cross section within a second plane that includes the central axis of the intake air channel.

The valve member may have an outer peripheral surface opposing an inner wall of the main body when the valve member is in a fully closed position. The contact surface may be formed on the outer peripheral surface.

In another aspect of the present teachings, the outer peripheral surface has a first part and a second part respectively positioned on the side of a valve closing direction and on the side of a valve opening direction. The first part may include the contact surface.

In another aspect of the present teachings, the valve seal surface is configured to conform to the configuration of the outer peripheral surface, including the first and second parts of the valve member.

Preferably, the second part is configured so as to not interact with the inner wall of the main body during the movement of the valve member away from a fully closed position.

In another aspect of the present teachings, the second part has a curved configuration as viewed in cross section within the second plane, so that the second part is continuously formed with the first part. With this configuration, there can be an improvement in the metering accuracy of the intake air during a small opening angle range of the valve member. Therefore, the performance of the throttle valve can also be improved during the small opening angle range of the valve member.

The second part may have the configuration of a portion of a circle and has a radius of curvature defining the circle.

Preferably, the circle of the second part has a first radius of curvature and a second radius of curvature respectively at a first point and a second point. The first radius of curvature may be larger than the second radius of curvature.

The radius of curvature of the second part may gradually decrease from the first radius of curvature to the second radius of curvature in the circumferential direction of the outer peripheral surface of the valve member. The decrease in the radius of curvature occurs relative to the circumferential distance away from the most remote point to the central axis.

In another aspect of the present teachings, the second part has a length in a direction of thickness of the valve member. The second part has a first length and a second length respectively at a first point and a second point. The first length is longer than the second length.

Preferably, the length of the second part gradually decreases from the first length to the second length in the circumferential direction. The decrease in the second part occurs relative to the circumferential distance away from the most remote point to the central axis.

In another aspect of the present teachings, the valve seal surface and the contact surface of the valve member in a fully closed position extend along the first plane extending substantially perpendicular to the central axis of the intake air channel. Also with this arrangement, it is possible to prevent or minimize of leakage of the intake air between the valve seal surface and the contact surface due to unintentional production of clearances therebetween.

In another aspect of the present teachings, the fully closed position is specified in a position where the valve member is rotated in a valve closing direction beyond a first plane extending substantially perpendicular to the central axis of the intake air channel. With this arrangement, the metering accuracy of the intake air during a small opening angle range of the valve member can be further improved.

In another aspect of the present teachings, methods of manufacturing throttle bodies are taught. The methods include the steps of molding a valve member using resin and inserting the molded valve member into another mold. The mold cooperates with the valve member to define a cavity conforming to the configuration of a main body of the throttle body. The methods further include the step of injecting resin into the mold and molding the main body. The valve seal surface is molded so as to conform to the contact surface of the valve member. With these methods, the valve seal surface can be molded so as to reliably conform to the configuration of the contact surface of the valve member.

Preferably, the valve member is molded integrally with a throttle shaft. In addition, the manufacturing should further comprise attaching metal bearings to the throttle shaft prior to the molding of the main body. The molded valve member is then inserted into the mold together with the throttle shaft and the metal bearings.

In another aspect of the present teachings, alternative methods of manufacturing the throttle bodies are taught. The methods include the steps of molding a main body of the throttle body using resin. The molded main body is then inserted into another mold. The mold cooperates with the main body to define a cavity conforming to the configuration of a valve member. The methods further include the step of injecting resin into the mold and molding the valve member, so that the contact surface is molded to conform to the valve seal surface of the main body.

Preferably, the methods further include the step of inserting a throttle shaft and metal bearings attached to the throttle valve into the mold. The valve member is then molded integrally with the throttle shaft and the metal bearings.

BRIEF DESCRIPTION OF THE DRAWINGS

FIG. 5(*b*) is a cross sectional view taken along line V(b)—V(b) in FIG. 5(*a*) and showing a main body of the throttle body in the state immediately after the molding process of the main body; and FIG. 5(*c*) is a cross sectional view taken along line V(c)—V(c) and showing the main body of the throttle body in the state immediately after the molding process; FIG. 6(*b*) is a cross sectional view taken along line VI(b)—VI(b) and showing the valve member displaced from the original fully closed position; and FIG. 6(*c*) is a cross sectional view taken along line VI(c)—VI(c) and showing the valve member displaced from the original fully closed position; FIG. 14(*b*) is an exploded enlarged view of a part of FIG. 14(*a*) and showing the relationship between one of outer peripheral surfaces of a valve member and a corresponding valve seal surface of a bore wall portion of a main body; FIG. 15(*b*) is a view similar to FIG. 14(*b*) but showing the relationship at the circumferential end of the outer peripheral surface; FIG. 16(*b*) is an enlarged view of a part of FIG. 16(*a*); FIG. 17(*b*) is an enlarged view of a part of FIG. 17(*a*); FIG. 26(*b*) is a cross sectional view taken along line XXVI(b)—XXVI(b) in FIG. 26(*a*) and also showing the main body; and FIG. 26(*c*) is a cross sectional view taken along line XXVI(c)—XXVI(c) in FIG. 26(*a*) and also showing the main body.

DETAILED DESCRIPTION OF THE INVENTION

Each of the additional features and teachings disclosed above and below may be utilized separately or in conjunction with other features and teachings to provide improved throttle bodies, throttle control devices having such throttle bodies, and methods of manufacturing such throttle bodies and throttle control devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

First Representative Embodiment

Figure 2:
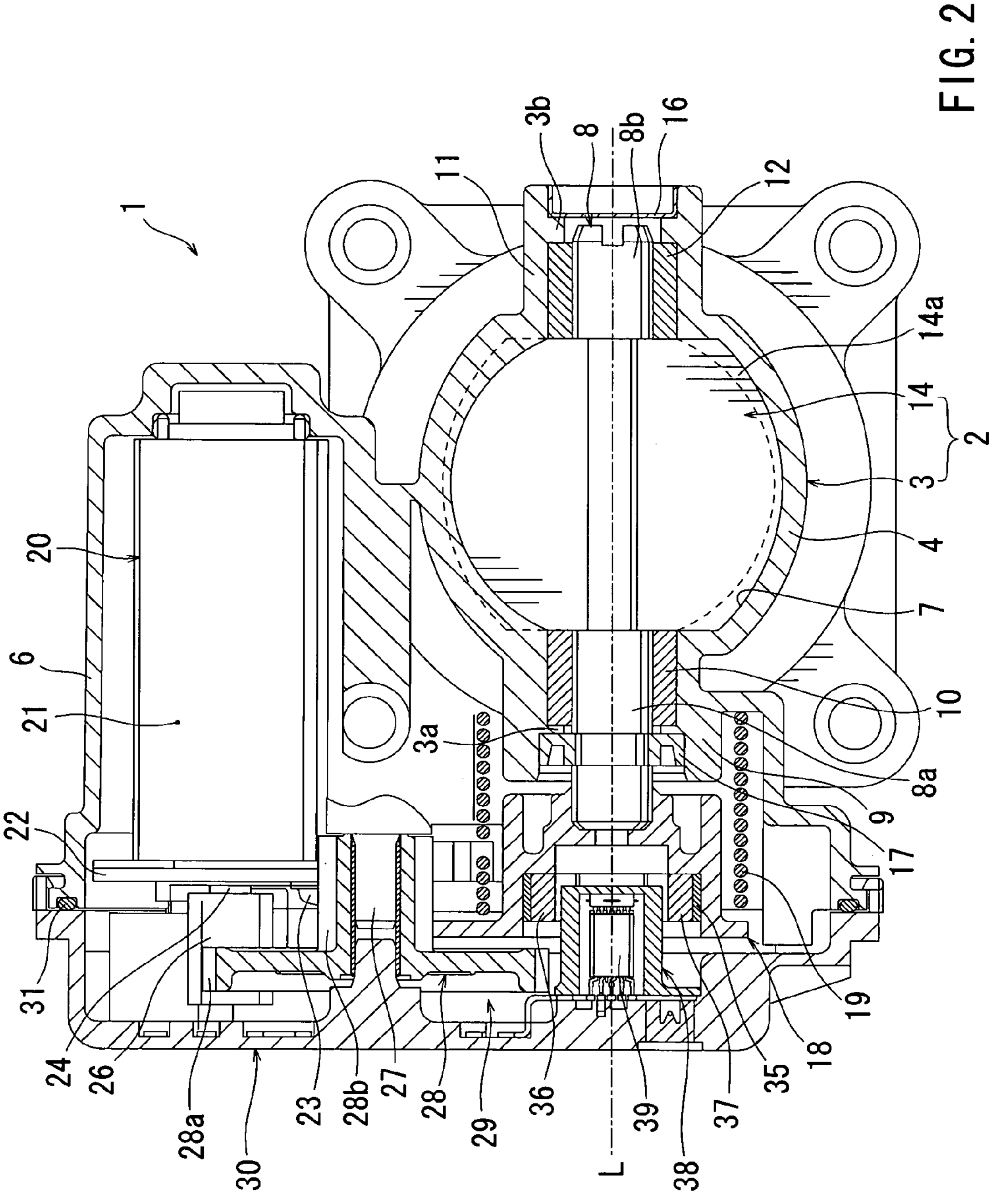
FIG. 2 is a cross sectional view taken along line II—II in FIG. 1.
Figure 3:
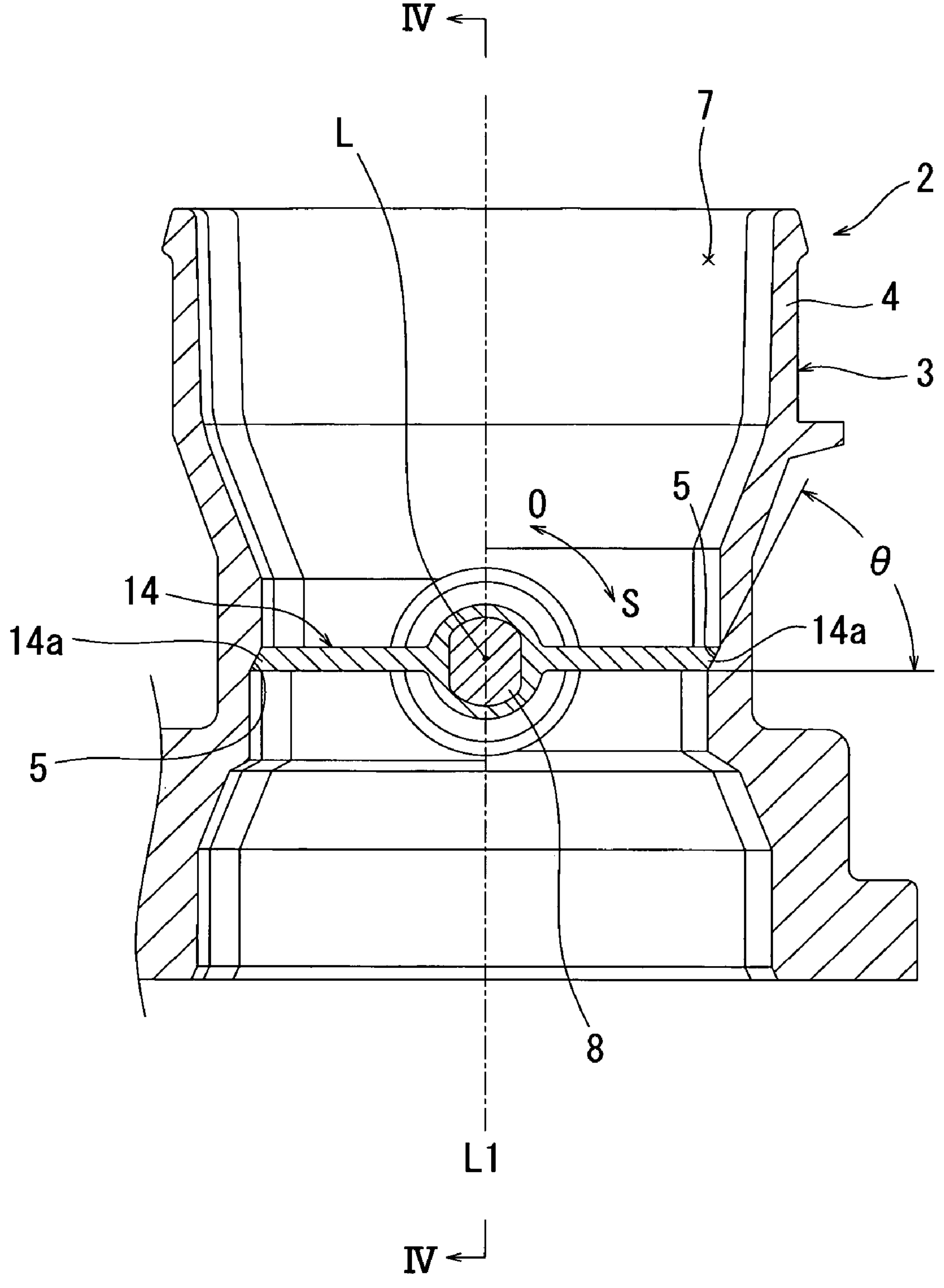
FIG. 3 is a cross sectional view taken along line III—III in FIG. 1.
Figure 4:
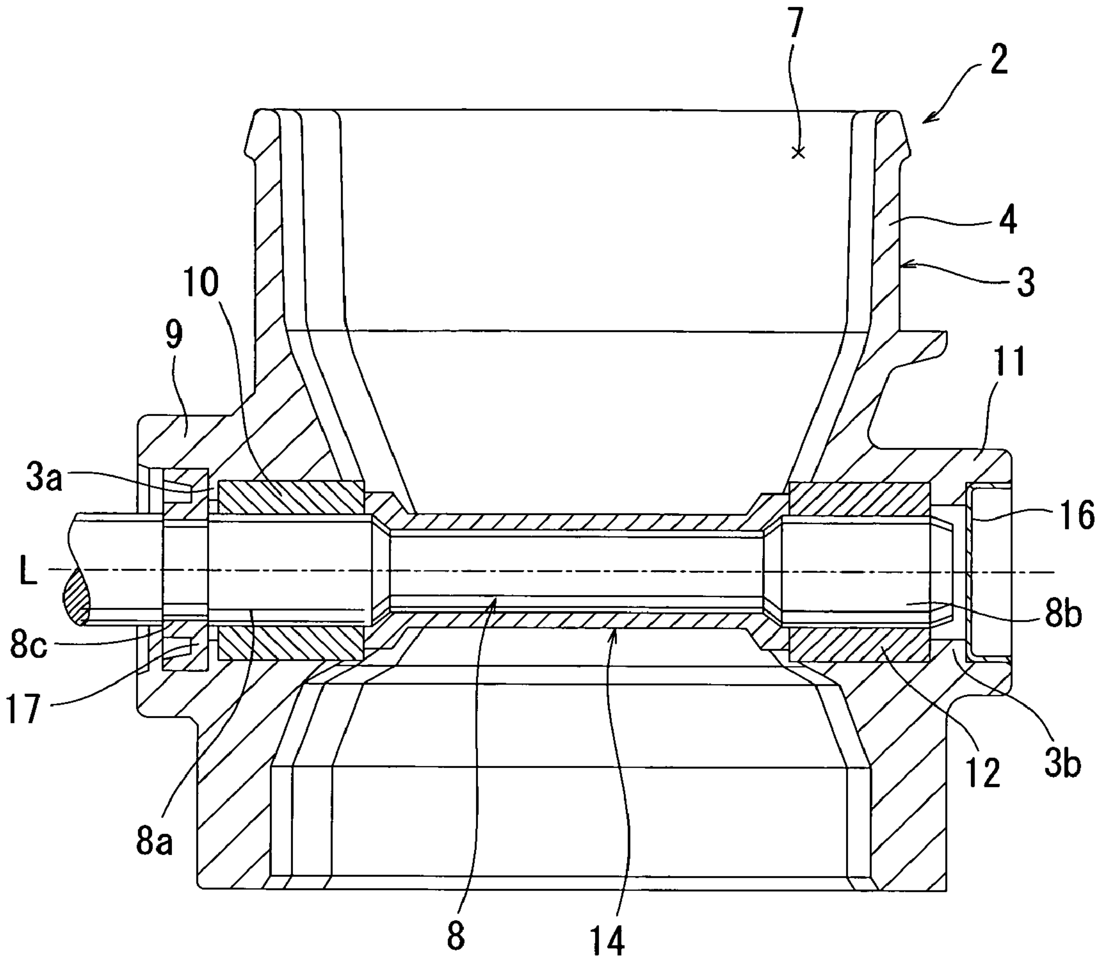
FIG. 4 is a cross sectional view taken along line IV—IV in FIG. 3.

A first representative embodiment will now be described with reference to FIGS. 1 to 10. The first representative embodiment is embodied as an electronically controlled throttle control device. The throttle control device has a throttle body 2 as a primary member. As shown in FIG. 2, the throttle body 2 has a main body 3 and a valve member 14 that are preferably made of resin. The main body 3 includes a bore wall portion 4 formed integrally with a motor housing 6. As shown in FIGS. 3 and 4, a substantially cylindrical intake air channel 7 is defined within the bore wall portion 4 and extends in a direction perpendicular to the sheet of FIG. 2. Although not shown in the drawings, an air cleaner and an intake manifold may be respectively connected to the upstream side and the downstream side of the bore wall portion 4.

As shown in FIGS. 2 and 4, a metal throttle shaft 8 is mounted within the bore wall portion 4 and extends across the intake air channel 7 in a diametrical direction. Left support portion 9 of the bore wall portion 4 rotatably supports a first end 8*a* (left end as viewed in FIG. 2) of the throttle shaft 8 via a metal bearing 10. The left support portion 9 is integrally formed with the bore wall portion 4. Conversely, a right support portion 11 of the bore wall portion 4 rotatably supports a second end 8*b* (right end as viewed in FIG. 2) of the throttle shaft 8 via a metal bearing 12. The right support portion 11 is also formed integrally with the bore wall portion 4. A plug 16 is fitted into the right support portion 11 in order to sealingly close an outer open end of the right support portion 11.

The valve member 14 is molded over the throttle shaft 8 and is adapted to open and seal (close) the intake air channel 7 as the throttle shaft 8 respectively rotates in directions indicated by arrows "O" and "S" in FIG. 3. The valve member 14 is coupled to a motor 20 that will be explained later. As the motor 20 is driven, the rotational position (opening angle) of the valve member 14 is changed so as to open and close the intake air channel. Consequently, controlling the flow of intake air through the intake air channel 7.

As shown in FIG. 2, the first end 8*a* of the throttle shaft 8 extends through the metal bearing 10. A throttle gear 18, configured as a sector gear, is fixedly mounted to the extended end of the throttle shaft 8. The throttle gear 18 may be made of resin. A back spring 19, preferably configured as a torsion coil spring, is interposed between the main body 3 and the throttle gear 18. The back spring 19 has an axis that is substantially the same the axis of the throttle gear 18, i.e., the L axis of the throttle shaft 8. The back spring 19 normally biases the throttle gear 18 in a direction towards a fully opened position of the valve member 14.

The motor housing 6 of the main body 3 has a substantially cylindrical tubular configuration and extends in parallel to the axis L of the throttle shaft 8. The motor housing 6 has a closed right end and an open left end, as viewed in FIG. 2. The motor 20 may be a DC motor and is inserted into the motor housing 6 through the open left end. A mount flange 22 extends from a motor casing 21. The motor casing 21 defines an outer contour of the motor 20. The mount flange 22 is preferably secured to the main body 3 by means of a fixing device such as screws 23 (only one screw 23 is shown in the drawings). A motor pinion 26 is fixedly mounted to the output shaft 24 of the motor 20. For example, the motor pinion 26 may be made of a resin material.

A countershaft 27 extends from the main body 3 towards a cover 30 (that will be explained later) along an axis substantially parallel to the rotational axis L of the throttle shaft 8. A counter gear 28 is rotatably mounted on the countershaft 27. The counter gear 28 may be made of a resin material. The counter gear 28 has a first gear portion 28*a* and a second gear portion 28*b*. The second gear portion 28*b* has a smaller diameter than the first gear portion 28*a*. The first gear portion 28*a* engages the motor pinion 26. The second gear portion 28*b* engages the throttle gear 18. In this way, the throttle gear 18, the motor pinion 26, and the counter gear 28, constitute a reduction gear mechanism 29.

The cover 30 is disposed on one side (left side as viewed in FIG. 2) of the main body 3 in order to cover the reduction gear mechanism 29 and other related parts from the outside environment. The cover 30 may be made of a resin material and may be joined to the main body 3 via a suitable joint mechanism, for example such as a snap-fit mechanism, a clip mechanism, and a screw tightening mechanism. An O-ring 31 is interposed between the main body 3 and the cover 30 in order to ensure a hermetic seal therebetween.

Figure 1:
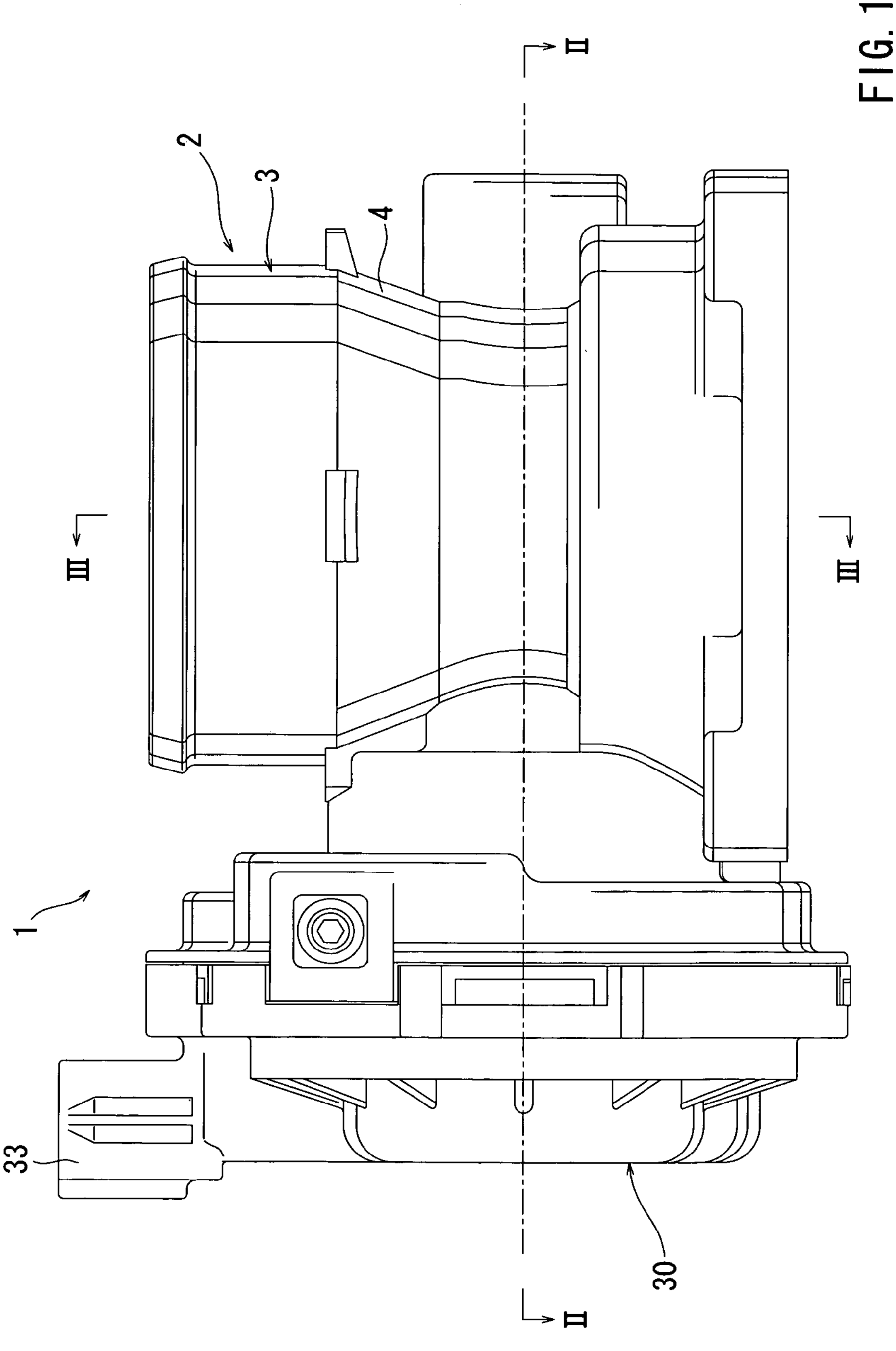
FIG. 1 is a front view of a throttle control device incorporating a throttle body according to a first representative embodiment.

As shown in FIG. 1, the cover 30 has a connector portion 33, to which a mating connector from an external power source and an electronic control unit (ECU) (not shown) can be connected. In order to establish this connection, although not shown in the drawings, the connector portion 33 includes terminals that are electrically connected to the motor 20 and a rotational angle sensor 38 that will be explained later.

Referring to FIG. 1, the motor 20 may be controlled based upon various control signals. Control signals including acceleration signals (representing the amount of depression of an acceleration pedal), traction control signals, constant speed signals and idling speed control signals are supplied from the ECU. For example, the ECU may be mounted on an automobile (not shown) in order to perform various control functions, including the aforementioned control of the motor 20. As the motor 20 is driven based upon the control signals received from the ECU, the rotation of the output shaft 24 of the motor 20 is transmitted to the throttle shaft 8 via the motor pinion 26, the counter gear 28, and the throttle gear 18. As a result, the valve member 14 is rotated to open and close the intake air channel 7.

As shown in FIG. 2, the throttle gear 18 is integrally molded with a ring-shaped yoke 35 made of magnetic material. The yoke 35 has the same axis as the rotational axis L of the throttle shaft 8. Two permanent magnets 36 and 37 are attached to the inner peripheral surface of the yoke 35 in order to produce a magnetic field. For example, the magnets 36 and 37 may be made of ferritic magnetic material. The magnets 36 and 37 preferably may be magnetized to produce substantially parallel magnetic lines therebetween or within an inner space defined by the yoke 35.

The rotational angle sensor 38 is attached to the inner wall of the cover 30 and has a sensor IC 39 that includes a magnetoresistive element. The rotational angle sensor 38 is positioned on the rotational axis L of the throttle shaft 8, between the magnets 36 and 37, so that the rotational angle sensor 38 is spaced apart from the magnets 36 and 37 by a predetermined distance. The sensor IC 39 of the rotational angle sensor 38 functions so as to calculate the output signals from the magnetoresistive element in order to output signals to the ECU representing the direction of the magnetic field (magnetic lines). In this way, the direction of the magnetic field can be detected without depending upon the strength of the magnetic field.

The operation of the throttle control device 1 (see FIG. 2) will now be described in general. When the engine of the automobile is started, the ECU controls the motor 20 so as to open and close the valve member 14 via the reduction gear mechanism 29, so that the flow rate of the intake air flowing through the intake air channel 7 is controlled as previously described. As the throttle shaft 8 rotates, the yoke 35 and the magnets 36 and 37 rotate together with the throttle gear 18. Therefore, the direction of the magnetic field across the sensor IC 39 of the rotational angle sensor 38 changes in response to the rotation of the magnets 36 and 37. As a result, the output signal from the sensor IC 39 changes. Based upon the output signal from the sensor IC 39, the ECU calculates the rotational angle of the throttle shaft 8, i.e., the opening angle of the valve member 14.

The ECU may perform various controls such as a fuel injection control, an opening angle correction control of the valve member 14, a speed-change control of an automatic transmission based on various signals from sensors, such as a speed sensor for detecting a traveling speed of the automobile, a crank angle sensor for detecting the rotational speed of the engine, an acceleration pedal sensor, an $O_2$ sensor and an air flow meter, in addition to the output signal from the sensor IC 39 or the calculated opening angle of the valve member 14 represented by the direction of the magnetic field produced by magnets 36 and 37. The direction of the magnetic field is a magnetic physical quantity.

The throttle body 2 will hereinafter be described in more detail. As shown in FIG. 3, the valve member 14 is made of resin and has a pair of right and left contact surfaces or outer peripheral surfaces 14a that may contact with respective right and left valve seal surfaces 5 formed on the main body 3. The right and left peripheral surfaces 14a are configured to be symmetrical with each other about a point on the rotational axis L. The main body 3 is preferably made of resin and is molded by an insertion molding process with the valve member 14 inserted into a mold (not shown in FIG. 3) The right and left valve seal surfaces 5 as well as the right and left outer peripheral surfaces 14*a* are formed symmetrically with respect to a point on the rotational axis L. The valve member 14 may be opened when the valve member 14 rotates in the counterclockwise direction (indicated by the arrow O in FIG. 3). The valve member 14 may be closed when the valve member rotates in a clockwise direction (indicated by the arrow S).

The valve seal surfaces 5 are configured such that each of the peripheral surfaces 14*a* of the valve member 14 can sealably contact with the corresponding valve seal surface 5 substantially along the entire relevant circumferential length of the peripheral surface 14*a*, even if the fully closed position of the valve member 14 relative to the main body 3 has been shifted due contraction of the main body 3 after the molding process. More specifically, as shown in FIG. 3, each of the valve seal surfaces 5 is inclined by an angle θ relative to a diametrical plane that includes the rotational axis L of the throttle shaft 8 and is perpendicular to the central axis L1 of the intake air channel 7. The value of the angle θ of each of the valve seal surfaces 5 becomes gradually smaller in the circumferential direction from a central point, defined as the point that is the most remote from the rotational axis L (i.e., a point on the circumference of the valve member 14 intersecting a line drawn perpendicular to the axis L), toward either circumferential ends, which are the nearest to the rotational axis L (i.e., nearest to either support portion 9 and 11 of the main body 3).

In this connection, each of the outer peripheral surfaces 14*a* is designed so as to have a configuration conforming to the corresponding valve seal surface 5 when the valve member 14 is in a fully closed position. In other words, each of the outer peripheral surfaces 14*a* is inclined by the same angle θ relative to the diametrical plane including the rotational axis L of the throttle shaft 8, as the angle θ of a corresponding point of the valve seal surface 5. The value of the angle θ of each of the outer peripheral surfaces 14*a* becomes gradually smaller in the circumferential direction from a central point (previously defined as the point most remote from the rotational axis L), towards the circumferential ends (previously defined as the ends of the circumference nearest to the rotational axis L or nearest to the support portions 9 and 11 of the main body 3).

The angle θ is determined such that the outer peripheral surfaces 14*a* of the valve member 14 can reliably and sealably contact with the respective valve seal surfaces 5 over the entire relevant circumferential length of the valve member 14. The angle θ is determined so as to provide this contact even if the fully closed position of the valve member 14 has been displaced or altered due to contraction of the main body 3.

Figure 5A:
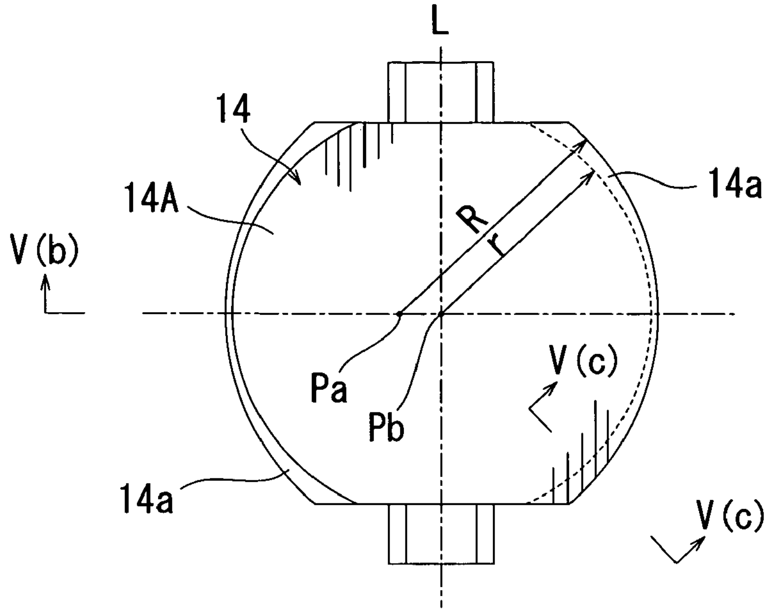
FIG. 5(*a*) is a plan view of a valve member of the throttle body.
Figure 5B:
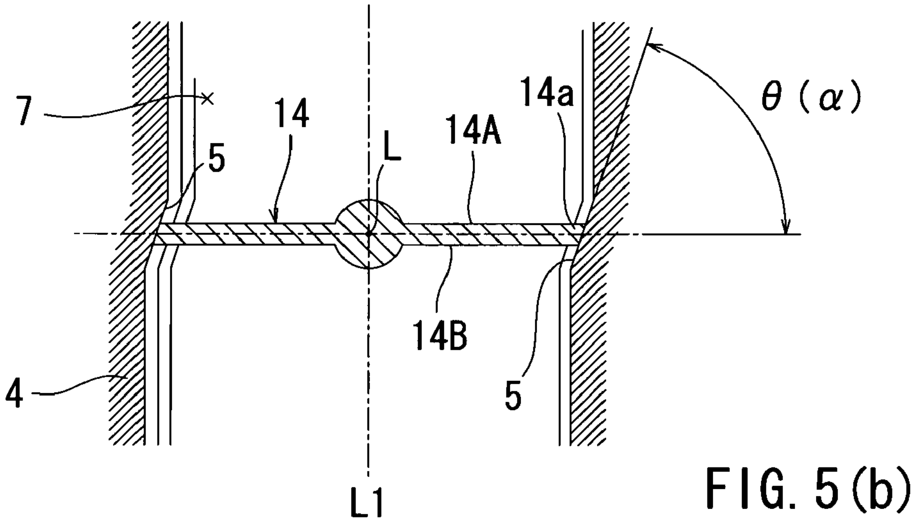
Figure 5C:
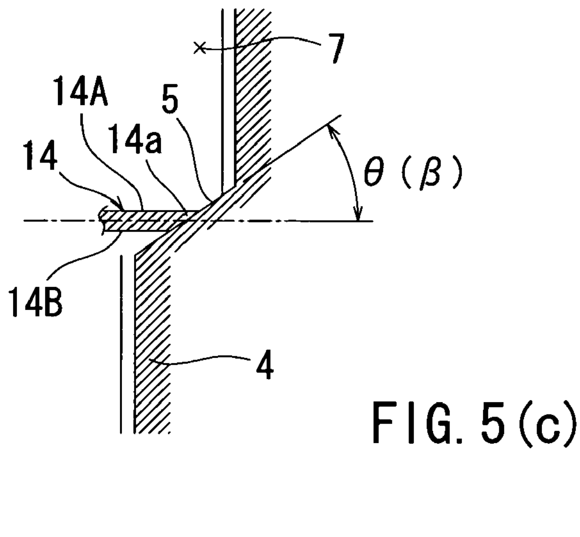

The configuration of the valve seal surfaces 5 will now be described in more detail with respect to the relationship between the main body 3 and the valve member 14, before and after contraction of the main body 3. As shown in FIG. 5(*a*), the right side outer peripheral surface 14*a* has a first peripheral edge extending along a circle having a radius R about a point Pa on an open-side surface 14A of the valve member 14. The right side outer peripheral surface 14*a* also has a second peripheral edge extending along a circle having a radius r about a point Pb on a close-side surface 14B (see FIG. 5*b*), opposite to the surface 14A (i.e., on an opposing surface of the valve member 14). Similarly, the left side outer peripheral surface 14*a* has a first peripheral edge extending along a circle having the radius R about a point on the surface 14B. The center point for the first peripheral edge of the left side outer peripheral surface 14*a* is symmetrical with the point Pa of the surface 14A. The left side outer peripheral surface 14*a* also has a second peripheral edge extending along a circle having the radius r about a point on the surface 14A. The second peripheral edge center point of the left side outer peripheral surface is symmetrical with the point Pb of the surface 14B. In this representative embodiment, the point Pb is set at the center of the valve member 14, i.e., on a central line L1 of the intake air channel 7. The radiuses R and r are specified to satisfy the following relationship:

$$R>r$$

The angle θ of each valve seal surface 5 is set to be an angle θ(α) at the point most remote from the rotational axis L, as shown in FIG. 5(*b*). The angle θ is set to be an angle θ(β) at the circumferential ends, as shown in FIG. 5(*c*). Consequently, the angles θ(α) and θ(β) are specified to have the following relationship:

$$\theta(\alpha)>\theta(\beta)$$

In addition, the angle θ is selected so as to gradually decrease from θ(α) to θ(β) in the circumferential direction, i.e., from the most remote position to the circumferential ends.

Figure 6A:
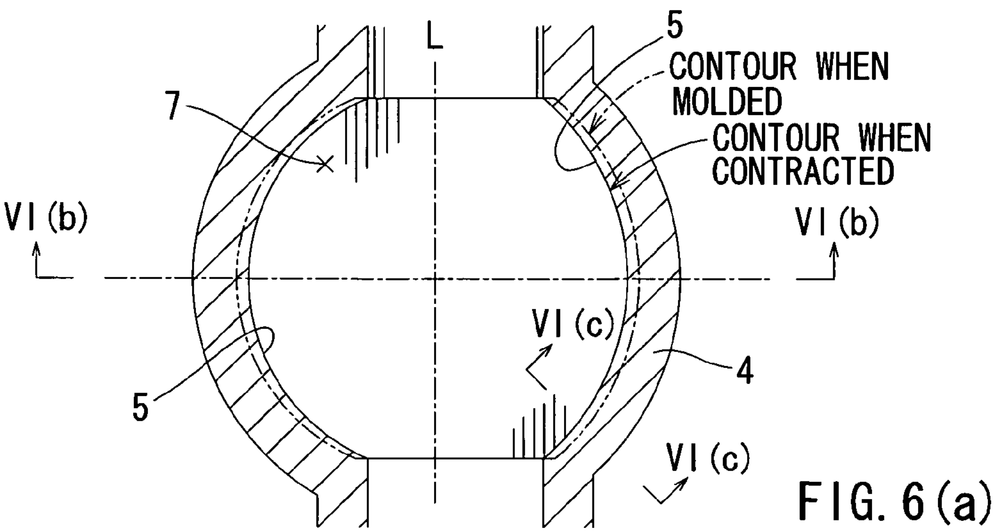
FIG. 6(*a*) is a cross sectional view of the main body and showing the configuration of the main body before and after contraction.
Figure 6B:
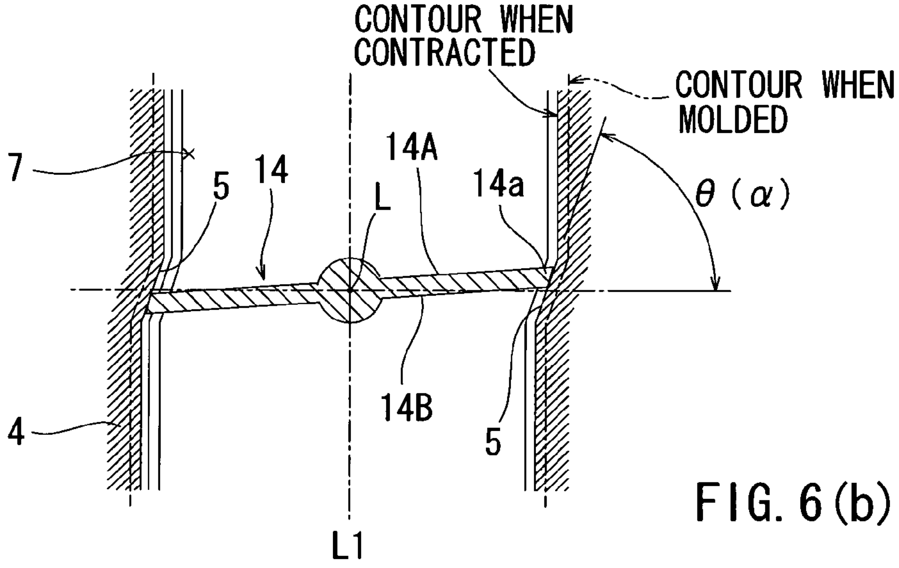
Figure 6C:
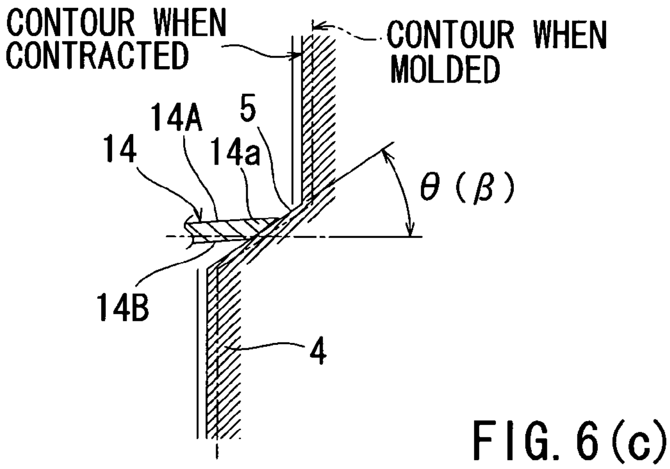

Assuming that the bore wall portion 4 of the main body 3 contracts so as to uniformly reduce the diameter by a predetermined length with respect to the circumferential direction, as shown in FIG. 6(*a*), the valve member 14 may be displaced from an original fully closed position (established prior to contraction of the main body 3) by a certain angle in the opening direction. However, the most remote point (from the rotational axis L) of each peripheral surfaces 14*a* can still closely contact (in point contact) with a corresponding valve seal surface 5 as shown in FIG. 6(*b*). In addition, the circumferential ends of each peripheral surfaces 14*a* can also still closely contact (in point contact) with a corresponding valve seal surface 5, as shown in FIG. 6(*c*). Therefore, each peripheral surface 14*a* can closely contact (in line contact) with a corresponding valve seal surface 5 along the entire relevant circumferential length without producing significant clearance with respect to the valve seal surface 5. As a result, it is possible to prevent or minimize any leakage of the intake air that would have resulted from a clearance between the main body 3 and the valve member 14. This result is possible even if the fully closed position of the valve member 14 has been displaced due to the contraction of the main body 3.

Figure 7A:
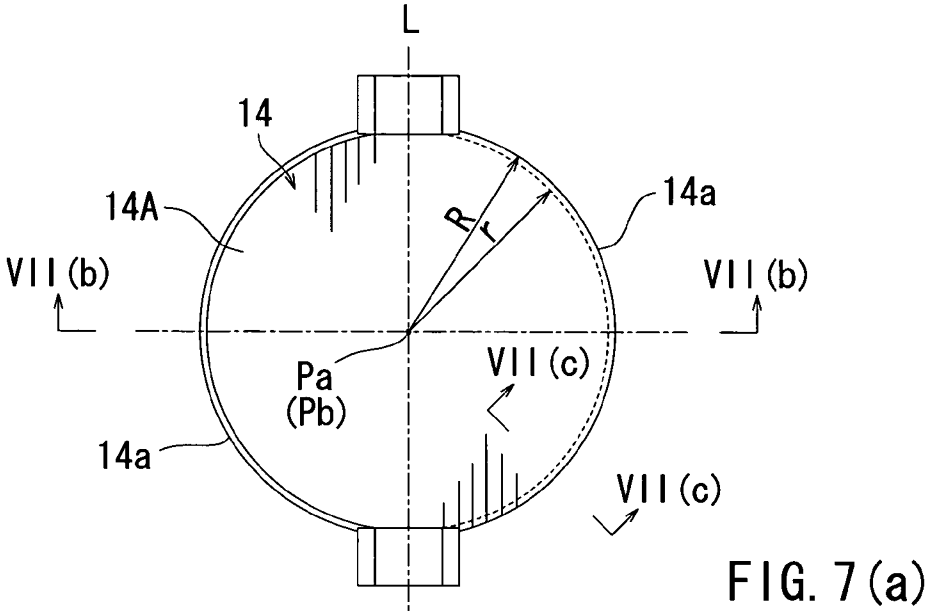
FIGS. 7(*a*), 7(*b*), and 7(*c*), are view similar to FIGS. 5(*a*), 5(*b*), and 5(*c*), but showing a comparative arrangement.
Figure 7B:
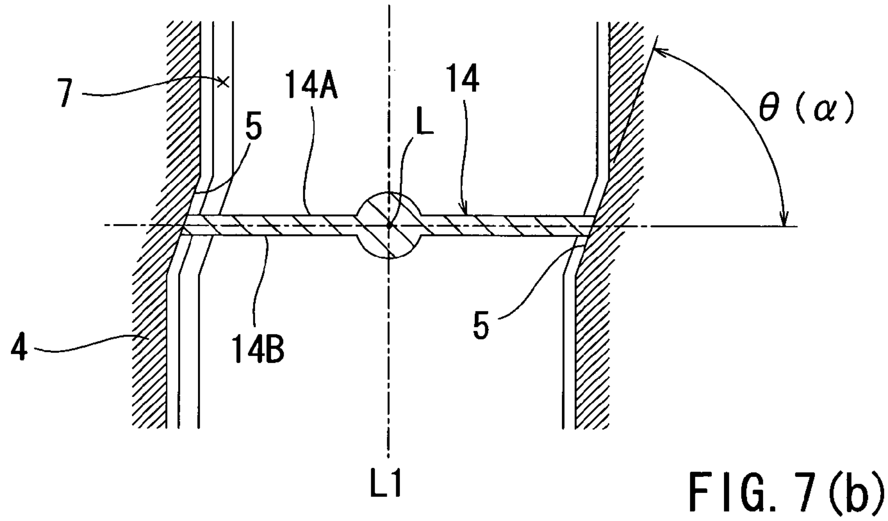
Figure 7C:
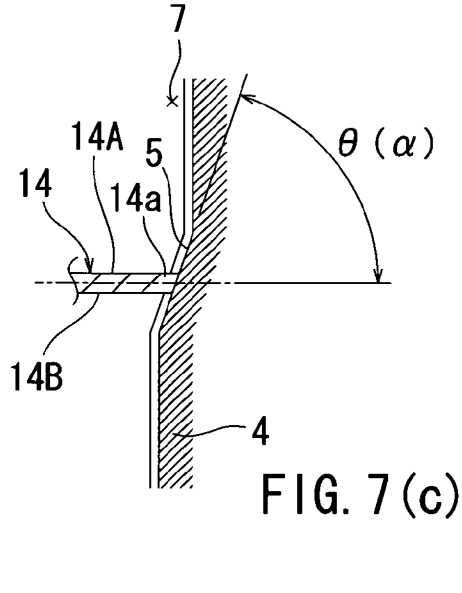

As a comparison example, if the angle θ of each of the valve seal surfaces 5 is a constant value of angle θ(α) along the entire relevant circumferential length, the valve member 14 may be configured as shown in FIG. 7(*a*). The valve member 14 of this configuration includes the central point Pa of the radius R (>r) and the central point Pb of the radius positioned coincidentally at the center of the valve member 14 (i.e., along the central axis L1 of the intake air channel 7) as shown in FIG. 7(*a*) and FIG. 7(*b*).

Figure 8A:
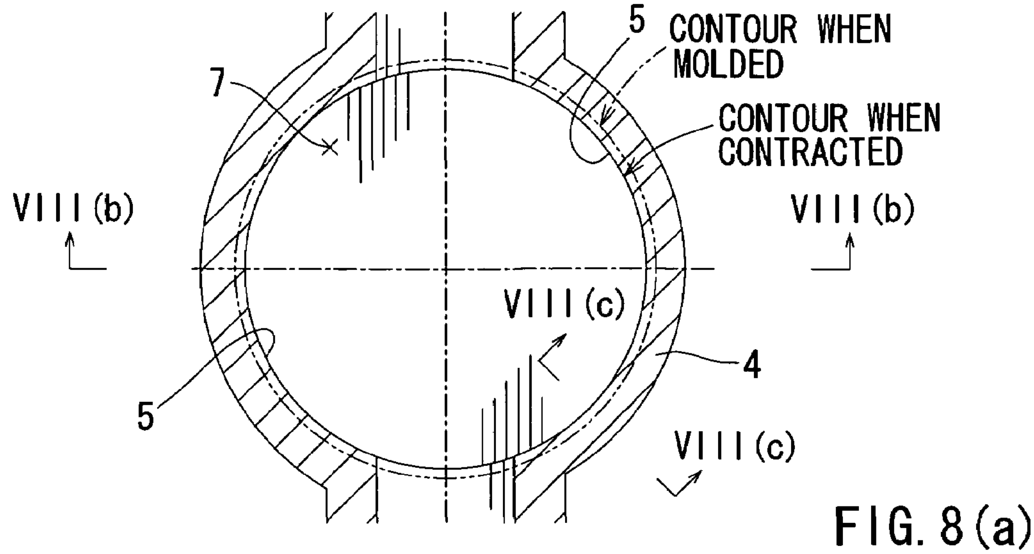
FIGS. 8(*a*), 8(*b*), and 8(*c*), are view similar to FIGS. 6(*a*), 6(*b*), and 6(*c*), but showing the comparative arrangement.
Figure 8B:
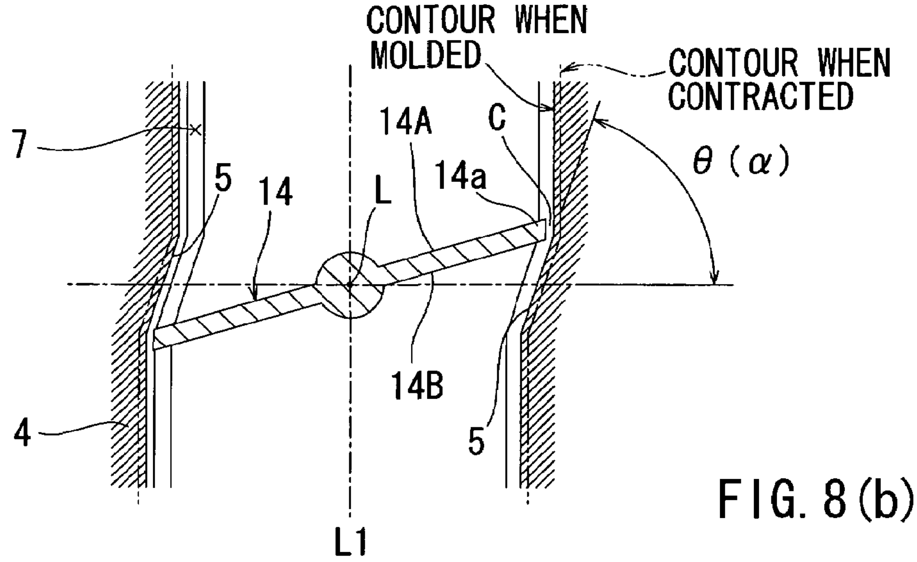
Figure 8C:
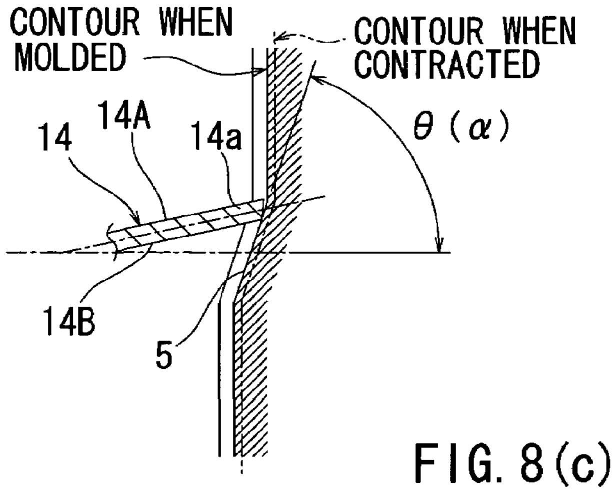

Assuming that the bore wall portion 4 of the main body 3 uniformly contracts to reduce the diameter by a predetermined length (that may be equal to the length of the situation discussed with reference to FIG. 6(*a*)) with respect to a circumferential direction, as shown in FIG. 8(*a*), the resulting fully closed position of the valve member 14 may be displaced by a certain angle in an opening direction from a fully closed position possible prior to the contraction of the main body 3. In this case, the circumferential ends of each peripheral surfaces 14*a* may still closely contact (in point contact) with a corresponding valve seal surface 5 as shown in FIG. 8(*c*). However, the most remote point (from the rotational axis L) of each peripheral surface 14*a* may not closely contact with the corresponding valve seal surface 5, as shown in FIG. 8(*b*). Consequently, if the angle θ of the valve seal surfaces is a constant value, a clearance C may be produced between each peripheral surface 14*a* and the corresponding valve seal surface 5. As a result, intake air may be able to leak through the clearance C.

If the constant angle θ of each of the valve seal surfaces 5 in this comparative example is specified so as to have an angle that enables the peripheral surfaces 14*a* of the valve member 14 to contact with the corresponding valve seal surface 5 at a point most remote from the rotational axis L (see FIG. 8(*b*)), then the circumferential ends of the peripheral surfaces 14*a* may be wedged into the valve seal surfaces 5 (see FIG. 8(*c*)). Therefore, the valve member 14 may not properly operate if a constant angle θ is specified for this configuration.

Consequently, if the angle θ of each of the valve seal surfaces 5 is set to have a constant value along a circumferential direction, the valve member 14 may either allow the leakage of intake air in the fully closed position or may result in improper operation of the valve member 14.

Comparatively, according to the representative embodiment, the peripheral surfaces 14*a* of the valve member 14 can sealably contact with the respective valve seal surfaces 5 of the main body 3, even if the fully closed position of the valve member 14 has been displaced due to the contraction of the main body 3. Therefore, potential malfunction of the valve member 14 and potential leakage of the intake air can be prevented or minimized.

Further, according to the representative embodiment, the valve member 14 is molded to surround a portion of a throttle shaft 8. In addition, opposite ends in an axial direction of the throttle shaft 8 slidably contact with the respective ends of the metal bearings 10 and 12. As a result, the valve member 14 can be held in position relative to the axial direction of the throttle shaft 8. Preferably, a part of the throttle shaft 8 has a non-circular cross-sectional configuration, specifically, the part around which the valve member 14 is molded. In particular, the part of the throttle shaft 8 may have a circular cross-sectional configuration with flat or chamfered diametrically opposing sides, as shown in FIG. 3.

As shown in FIG. 4, a removal prevention portion 3*a* extends from the inner wall of the support portion 9 of the main body 3 in order to prevent the left side metal bearing 10 from being removed in a direction opposite to the valve member 14 (i.e., the left direction as viewed in FIG. 4). In addition, a removal prevention portion 3*b* extends from the inner wall of the support portion 11 in order to prevent the right side metal bearing 11 from being removed in a direction opposite to the valve member 14 (i.e., the right direction as viewed in FIG. 4).

Further, as shown in FIG. 4, an annular seal member 17, preferably made of rubber, is fitted within the support portion 9 so as to contact with the removal prevention portion 3*a*. The seal member 17 may be forcibly inserted into the support portion 9 from an open side (i.e., the left side as viewed in FIG. 4) of the support portion 9. The inner peripheral surface of the annular seal member 17 is slidably fitted into an annular circumferential recess 8*c* formed on an outer surface of the throttle shaft 8. The seal member 17 serves to prevent air within the cover 30 from entering the intake air passage 7, and to prevent the intake air within the intake air passage 7 from leaking into the cover 30.

A representative method of manufacturing the throttle body 2 will now be described. The representative method generally includes a valve molding process and a body molding process.

Figure 9:
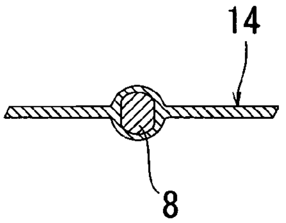
FIG. 9 is a cross sectional view of the valve member.

In the valve molding process, the valve member 14 is molded using a resin material, as shown in FIG. 9 via an injection molding process utilizing a valve forming mold (not shown). Here, as previously described, each of the outer peripheral surfaces 14*a* is inclined by the angle θ relative to a diametrical plane that includes the rotational axis L of the throttle shaft 8. The value of the angle θ of each of the outer peripheral surfaces 14*a* becomes gradually smaller in the circumferential direction from a central point, which is the most remote from the rotational axis L, towards either circumferential end, which are the nearest to the rotational axis L (i.e., nearest to the support portions 9 and 11 of the main body 3, see FIG. 2 and FIG. 8).

The throttle shaft 8 may be inserted into the valve forming mold prior to the molding process of the valve member 14. Consequently, the valve member 14 can be integrally molded with the throttle shaft 8.

Figure 10:
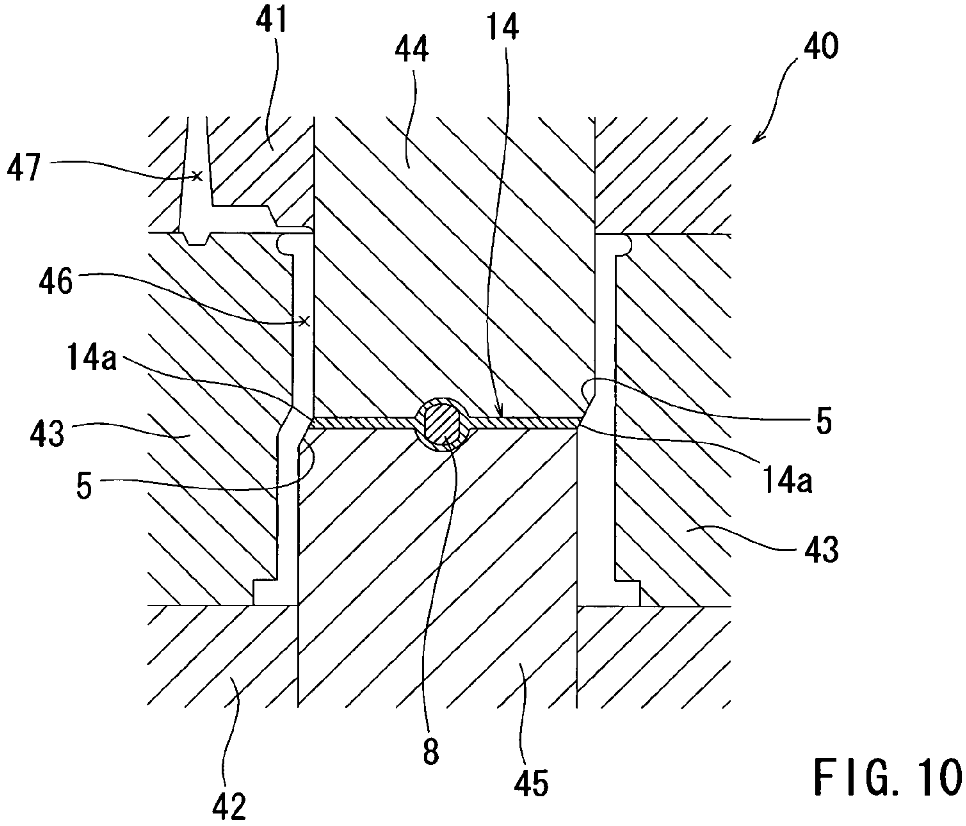
FIG. 10 is a vertical sectional view of a body forming mold for molding the main body.

Subsequently, in the body molding process, the valve member 14 is inserted into a body forming mold 40, shown in FIG. 10, and the main body 3 (see FIG. 3) is then molded from a resin material via an injection molding process. More specifically, the body forming mold 40 has an upper main mold part 41, a lower main mold part 42, a plurality of side mold parts 43, an upper auxiliary mold part 44, and a lower auxiliary mold part 45 in order to define a cavity 46 within the body forming mold 40 corresponding to the configuration of the main body 3. The upper and lower auxiliary mold parts 44 and 45 function so as to hold the valve member 14 therebetween when the body forming mold 40 is closed. A molten resin filling port 47 is defined within the upper main mold part 41 and communicates with the cavity 46. The molten resin can be injected into the cavity 46 via the filling port 47 from the upper side of the upper main mold part 41.

As previously described, the valve member 14 is integrally molded with the throttle shaft 8. In addition, the metal bearings 10 and 12 (see FIG. 4) may be fitted onto the throttle shaft 8. Therefore, the valve member 14 may be inserted into the body forming mold 40 together with the throttle shaft 8 and the metal bearings 10 and 12. Then, the mold parts 41 to 45 are closed. Thereafter, the molten resin is injected into the cavity 46 defined within the closed mold 40.

After the injected resin within the cavity 46 has cooled to form the main body 3, the mold parts 41 to 45 may be moved in order to open the mold 40 and release the molded product (i.e., the throttle body 2 having the valve member 14, the throttle shaft 8, and the metal bearings 10 and 12) from the mold 40. As shown in FIG. 10, the outer peripheral surfaces 14*a* of the valve member 14 are exposed to the cavity 46 so as to define parts of the wall of the cavity 46. As a result, the outer peripheral surfaces of the valve member 14, having an inclination angle θ, can mold the valve seal surfaces 5.

After the throttle body 2 has been manufactured as described above, the plug 16, the seal member 17, back spring 19, the motor 20, the reduction gear mechanism 29, and the cover 30 are mounted to the throttle body 2. The mounting of the various components completes the throttle control device 1 shown in FIG. 2.

The resin material used for the main body 3 and the valve member 14 may preferably be a composite material containing synthetic resin as a matrix or a base material. The matrix synthetic resin may be chosen, for example, from a group consisting of polyester resin, such as polyethylene terephthalate and polybutylene terephthalate; polyolefin resin, such as polyethylene and polypropylene; polyamide resin, such as polyamide 6, polyamide 66 and aromatic polyamide; general purpose resin, such as ABS, polycarbonate and polyacetal; super engineering plastic, such as polyphenylene sulfide; polyethersulfone; polyetheretherketone, polyethernitrile, and polyetherimide; thermoset resin, such as phenol resin, epoxy resin and unsaturated polyester resin; silicone resin; and Teflon® resin.

The composite material may contain fibrous material and filler. For example, fibrous material may be chosen from a group consisting of glass fiber, carbon fiber, ceramic fiber, cellulose fiber, vinal fiber, brass fiber, and aramid fiber. The filler may be chosen from a group consisting of calcium carbonate, zinc oxide, titanium oxide, alumina, silica, magnesium hydroxide, talc, calcium silicate, mica, glass, carbon, graphite, thermoset resin powder, and cashew dust. In some cases, the composite material also may contain flame retarder, ultra violet absorption agent, antioxidant, or lubricant.

As described above, according to the representative throttle body 2, the valve seal surfaces 5 are formed on the inner wall of the main body 3, so that the outer peripheral surfaces 14*a* of the valve member 14 sealably contact with the valve seal surfaces 5 when the valve member 14 is in a fully closed position. In particular, the valve seal surfaces 5 are configured such that the outer peripheral surfaces 14*a* can sealably contact with the outer peripheral surfaces 14*a* along the entire relevant circumferential length of the outer peripheral surfaces 14*a*, even if the fully closed position of the valve member 14 has been displaced due contraction of the main body 3 after the molding process.

More specifically, each of the valve seal surfaces 5 are formed on the bore wall portion 4 of the body member 3 and are inclined by an angle θ, relative to a diametrical plane that includes the rotational axis L of the throttle shaft 8 and is perpendicular to the central axis L1 of the intake air channel 7. The value of the angle θ of each of the valve seal surfaces 5 becomes gradually smaller in either circumferential direction from a central point, which is the point most remote from the rotational axis L, towards the circumferential ends, which are the nearest to the rotational axis L (i.e., nearest to the support portions 9 and 11 of the main body 3).

Therefore, it is possible to prevent or minimize potential leakage of air through clearances between the outer peripheral surfaces 14*a* and the respective valve seal surfaces 5. In addition, it is possible to prevent the outer peripheral surfaces 14*a* of the valve member 14 from being wedged into the valve seal surfaces 5, possibly causing the malfunction of the valve member 14 when the valve member 14 is in a fully closed position.

Further, according to the representative method of manufacturing the throttle body 2, the main body 3 is molded using a resin material via an insert molding process with the resin valve member 14 previously inserted into the mold 40. Therefore, it is not necessary to use a mold having a complex structure in order to mold the throttle body 2.

The seal between the outer peripheral surfaces 14*a* and the respective valve seal surfaces 5 may be further improved by coating a sealing agent on the outer peripheral surfaces 14*a* and/or the valve seal surfaces 5.

Second Representative Embodiment

A second representative embodiment will now be described with reference to FIG. 11. The second representative embodiment relates to a modification of the first representative embodiment and differs from the first representative embodiment only in the configuration of the valve member. In all other respects, the second representative embodiment is the same as the first representative embodiment.

Figure 11:
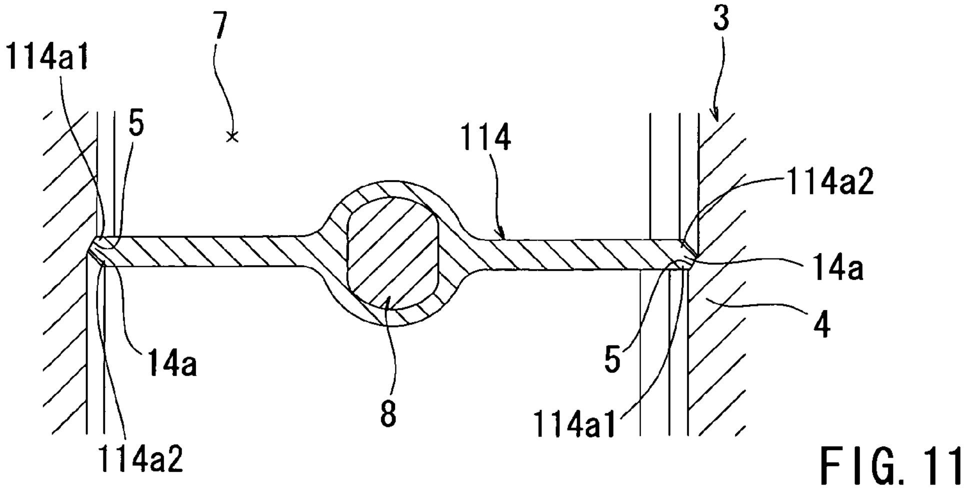
FIG. 11 is a cross sectional view of a throttle body of a throttle control device according to a second representative embodiment.

A valve member 114 shown in FIG. 11 is different from the valve member 14 of the first representative embodiment in that each of outer peripheral surfaces 114*a* has a first part 114*a*1 and a second part 114*a*2, each corresponding to substantially half the thickness of the valve member 14. The first part 114*a*1 is positioned on the closing side of the valve member 114 and serves as a contact surface for contacting with the corresponding valve seal surface 5. In the same manner as the outer peripheral surface 14*a* of the first representative embodiment, the first part 114*a*1 is inclined by an angle θ in order to sealably contact with the valve seal surface 5 when the valve member 114 is in a fully closed position. The second part 114*a*2 does not contact with the valve seal surface 5 and has a circumferential surface inclined in a direction opposite to the direction of inclination of the circumferential surface of the first part 114*a*1. Therefore, the valve member 114 corresponds to a valve member 14 that is modified (i.e., cut) to form the circumferential surface of the second part 114*a*2. Also with this valve member 114, the first part 114*a*1 functions to provide the same operation as the outer peripheral surface 14*a* of the valve member 14 of the first representative embodiment.

Third Representative Embodiment

A third representative embodiment will now be described with reference to FIG. 12. The third representative embodiment also relates to a modification of the first representative embodiment and differs from the first representative embodiment in the configurations of the valve member and the valve seal surfaces. In all other respects, the second representative embodiment is the same as the first representative embodiment.

Figure 12:
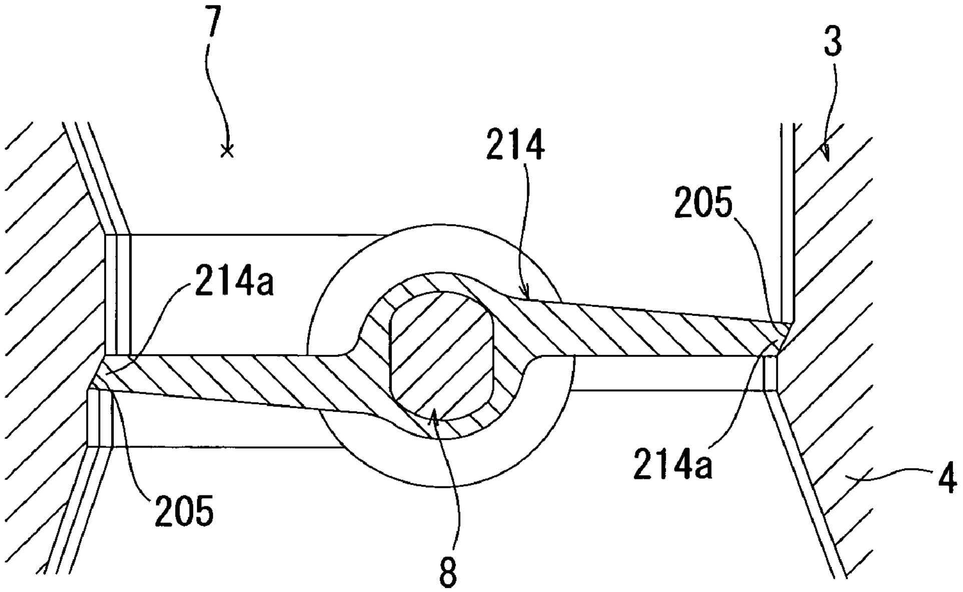
FIG. 12 is a cross sectional view of a throttle body of a throttle control device according to a third representative embodiment.

As shown in FIG. 12, valve seal surfaces 205 formed on the bore wall portion 4 of the main body 3 are positioned so as to be displaced from each other in the axial direction of the intake air channel 7 (vertical direction as viewed in FIG. 12). The valve member 214 is configured such that the contact surfaces or the outer peripheral surfaces 214*a* are displaced from each other in the axial direction of the intake air channel 7. The valve seal surfaces 205 have the same configurations as the valve seal surfaces 5 of the first representative embodiment. In addition, the outer peripheral surfaces 214*a* have the same configurations as the outer peripheral surfaces 14*a* of the first representative embodiment.

With this arrangement, it is also possible to attain the same operations and advantages as the first representative embodiment.

Fourth Representative Embodiment

A fourth representative embodiment will now be described with reference to FIG. 13. The fourth representative embodiment also relates to a modification of the first representative embodiment and differs from the first representative embodiment in the configurations of the valve member and the valve seal surfaces. In all other respects, the fourth representative embodiment is the same as the first representative embodiment.

Figure 13:
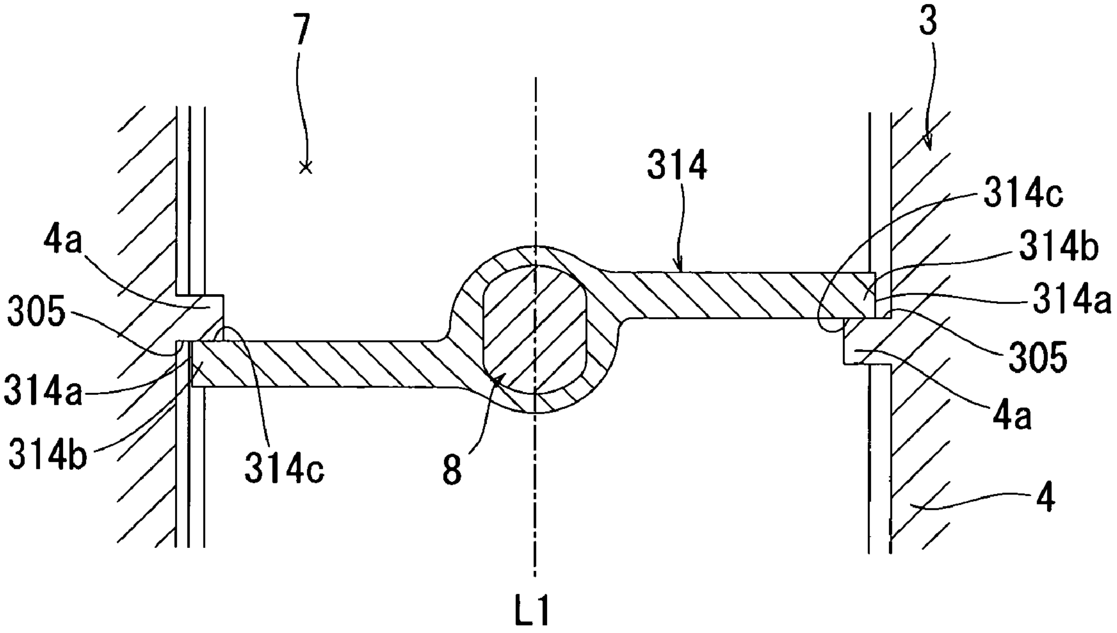
FIG. 13 is a cross sectional view of a throttle body of a throttle control device according to a fourth representative embodiment.

In this representative embodiment, each of outer peripheral portions 314*b* of a valve member 314 has a contact surface 314*c* on a closing direction side (i.e., the side in a clockwise direction as viewed in FIG. 13). The contact surface 314*c* contacts with a corresponding valve seal surfaces 305 within a plane that is substantially perpendicular to the central axis L1 of the intake air channel 7. The valve seal surfaces 305 are respectively formed on flange portions 4*a* that extend into the intake air channel 7 from the inner wall of the bore wall portion 4. Outer peripheral surfaces 314*a* of the valve member 314 are configured so as to substantially define portions of a cylindrical surface about the central axis L1 when the valve member 314 is in a fully closed position.

With this arrangement, the contact planes between the contact surfaces 314*c* of the valve member 314 and the respective valve seal surfaces 305 may not be altered even if the main body 3 has contracts after the molding process. Therefore, the contact surfaces 314*c* of the valve member 314 can still sealingly contact with the respective valve seal surfaces 305. As a result, it is possible to prevent or minimize any leakage of the air through potential clearances between the contact surfaces 314*c* and the respective valve seal surfaces 305. In addition, it is possible to prevent the outer peripheral portions 314*b* of the valve member 314 from being wedged into the valve seal surfaces 305, thereby causing a malfunction of the valve member 314 when the valve member 314 is in a fully closed position.

Fifth Representative Embodiment

Figure 19:
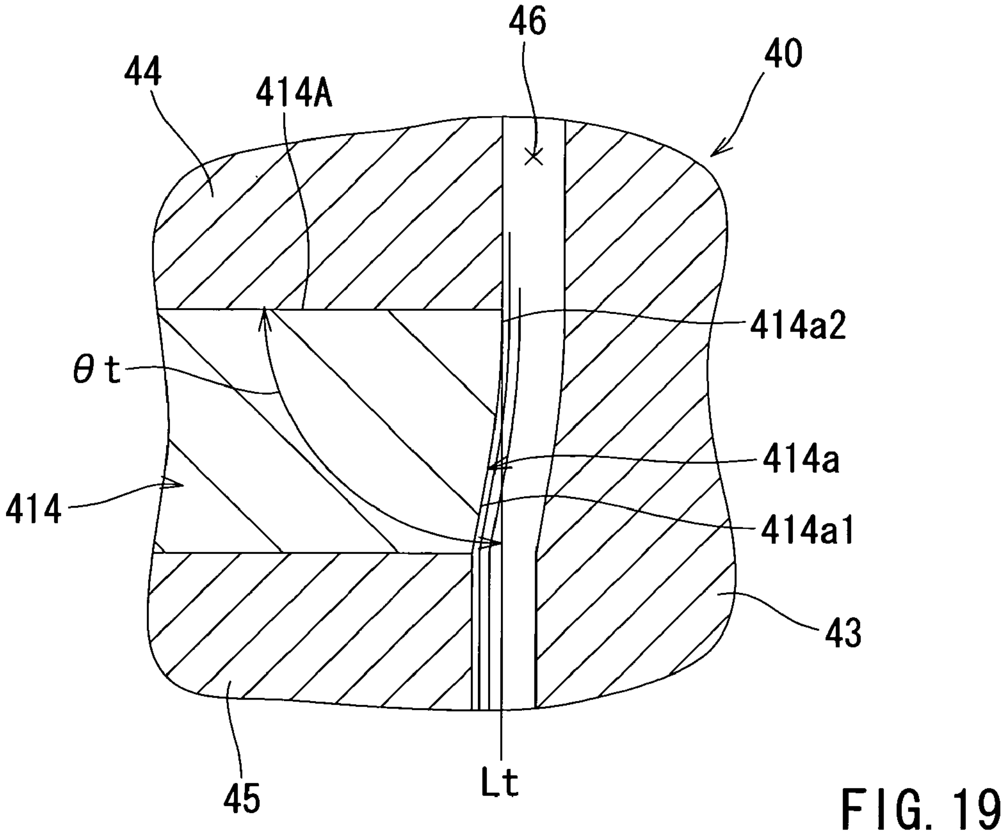
FIG. 19 is a view similar to FIG. 18 but illustrating an advantageous feature of a convex curved part of the valve member of the fifth representative embodiment.

A fifth representative embodiment will now be described with reference to FIGS. 14(*a*) and 14(*b*) to FIG. 19. The fifth representative embodiment also relates to a modification of the first representative embodiment and differs from the first representative embodiment in the configurations of the valve member and the valve seal surfaces. In all other respects, the fifth representative embodiment is the same as the first representative embodiment.

Figure 14A:
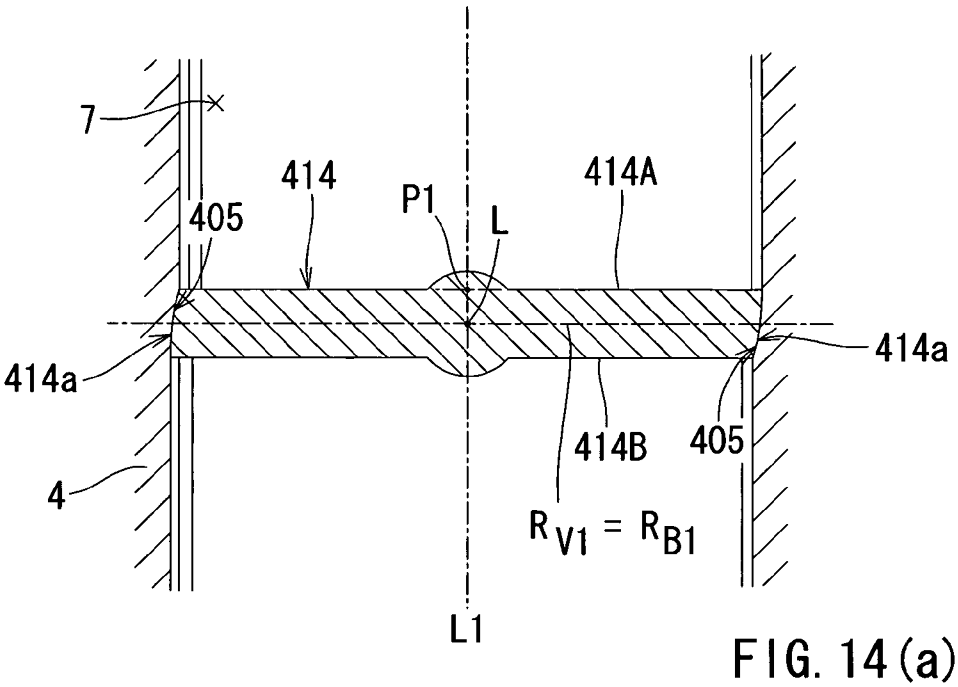
FIG. 14(*a*) is a cross sectional view of a throttle body of a throttle control device according to a fifth representative embodiment and showing the state immediately after the molding process of a main body.
Figure 14B:
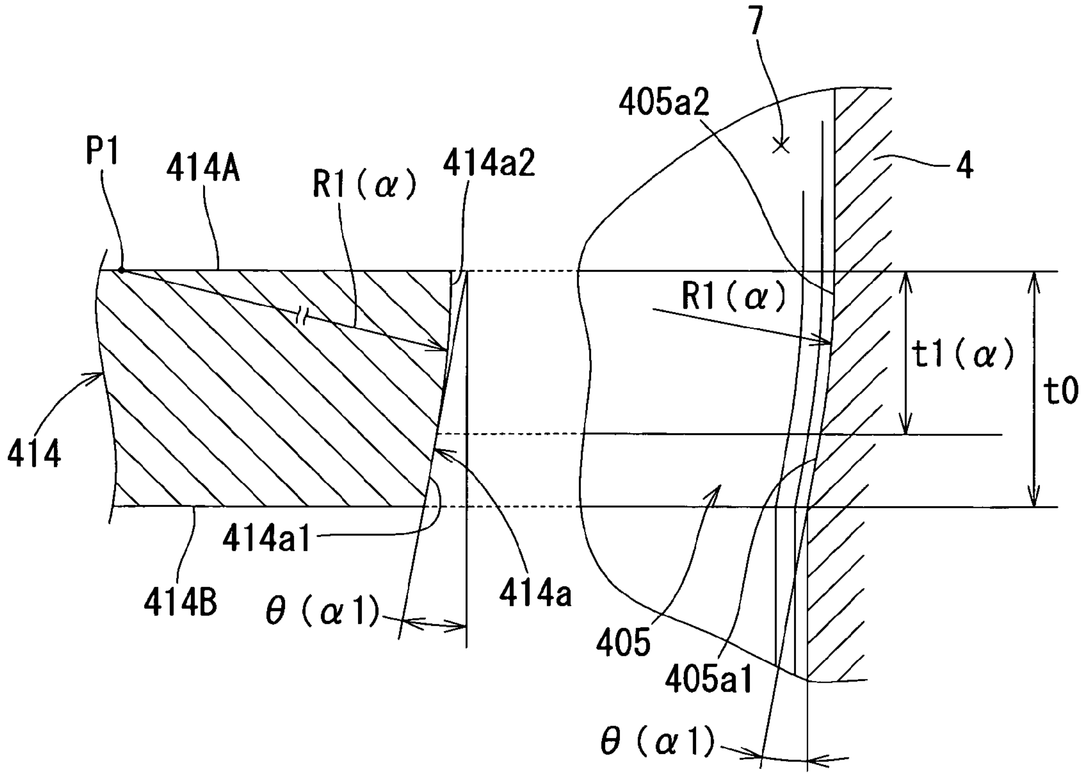

As shown in FIGS. 14(*a*) and 15(*a*), according to the fifth representative embodiment, each of outer peripheral surfaces 414*a* of a valve member 414 has a first part 414*a*1 on a closing side of the valve member 414 and a second part **414*a*2 on the open side of the valve member 414. The first part 414*a*1 is inclined by a variable angle θ relative to a diametrical plane that includes the rotational axis L of the throttle shaft 8. In FIGS. 14**(*b*) and 15(*b*), θ(α1) and θ(β1) are shown as an angle relative to the central line L1. In the same manner as in the first representative embodiment, the value of the angle θ of each of the first parts **414*a*1 becomes gradually smaller in the circumferential direction from a central point, which is the most remote from the rotational axis L, towards either circumferential end, which are the nearest to the rotational axis L (i.e., nearest to the support portions 9 and 11 of the main body 3**). Therefore, the fifth representative embodiment is substantially the same as the first representative embodiment in this respect.

As shown in FIGS. 14(*a*) and 14(*b*), the second part **414*a*2 is disposed on the upper side (as viewed in these figures) and is configured as a convex curved surface having a variable curvature radius (shown as curvature radius R1(α) in FIG. 14**(*b*) and curvature radius R1(β) shown in 15(*b*)). The second part **414*a*2 does not extend outward beyond a plane defined by the first part 414*a*1**.

Figure 15A:
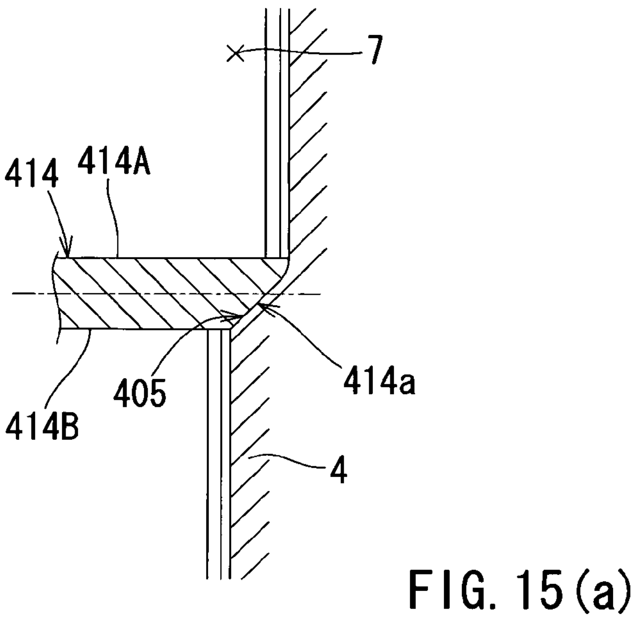
FIG. 15(*a*) is a cross sectional view similar to FIG. 5(*c*) but showing the arrangement of the fifth representative embodiment.
Figure 15B:
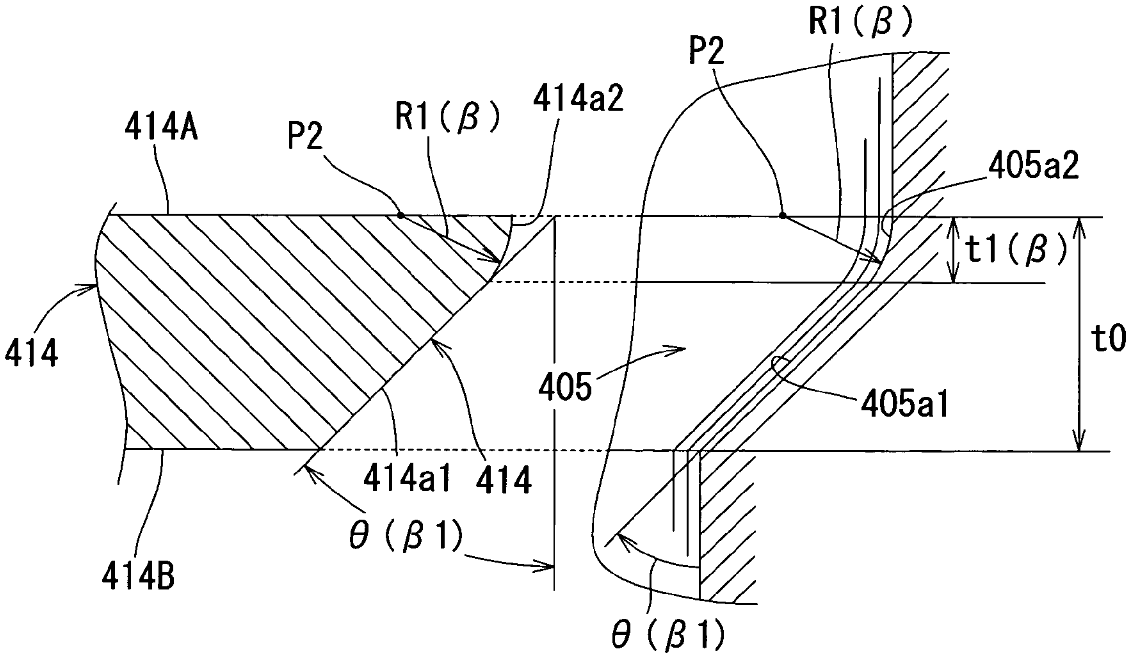

As shown in FIG. 14(*b*), at the central point that is the most remote from the rotational axis L, the second part **414*a*2 has the curvature radius R1(α) about a central point P1 (see FIG. 14**(*a*)) of an open-side surface 414A of the valve member 414. As shown in FIG. 15(*b*), at either circumferential end, which are nearest to the rotational axis L or to the support portions 9 and 11 of the main body 3, the second part **414*a*2 has the curvature radius R1(β) about a point P2 (see FIG. 14**(*a*)) that is positioned on the open-side surface 414A, between the point P1 and the peripheral surface **414*a***. Here, the curvature radiuses R1(α) and R1(β) are specified so as to satisfy the following relationship:

$$R1(\alpha)>R1(\beta)$$

In addition, the value of the curvature radius gradually decreases from the curvature radius R1(α) at the central point to the curvature radius R1(β) at the circumferential ends of the second part **414*a*2. Further, a thickness of the second part 414*a*2 in the direction of the thickness of the valve member 414 gradually decreases from a thickness t1(α) at the central point (see FIG. 14**(*b*)) to a thickness t1(β) at the circumferential ends (see FIG. **15*b*). In this representative embodiment, the thickness t1(α) is set to be about 70% of an overall thickness t0 of the valve member 414 at the outer peripheral surfaces 414*a***. The thickness t1(β) is set to be about 25% of the overall thickness t0.

In this connection, each of valve seal surfaces 405 of the main body 3 is configured to have a first part **405*a*1 and a second part 405*a*2 (see FIGS. 14**(*b*) and 15(*b*)), which respectively conform to the first part **414*a*1 and the second part 414*a*2 of the valve member 414**.

Figure 16A:
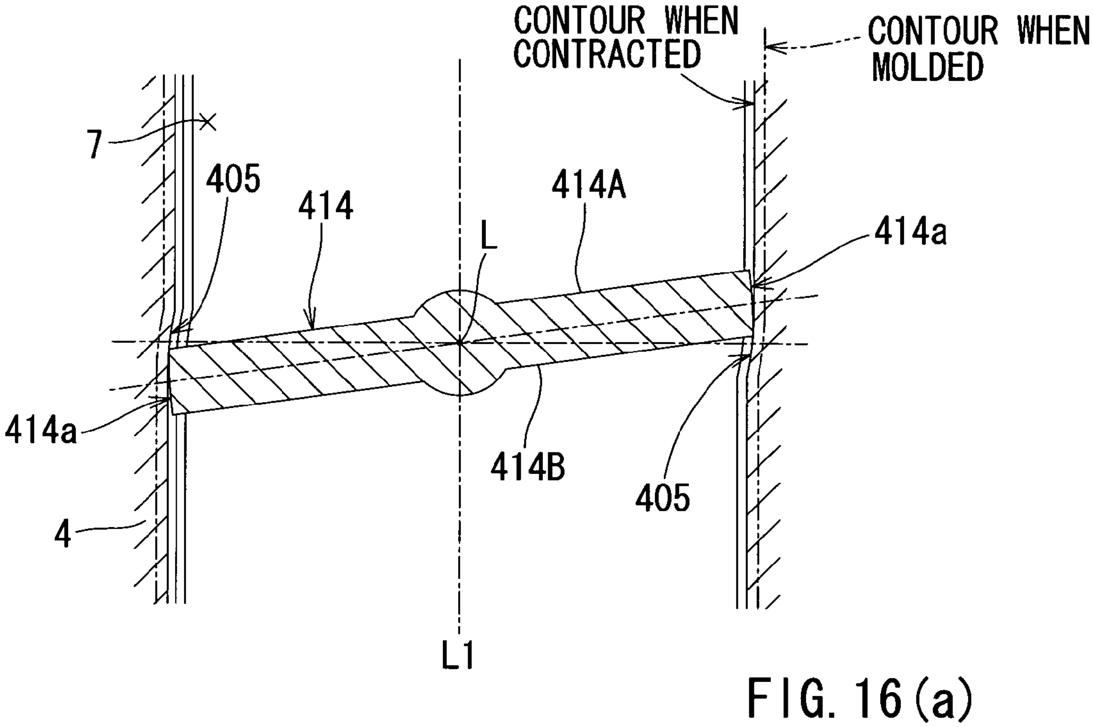
FIG. 16(*a*) is a view similar to FIG. 14(*a*) but showing the state after contraction of the main body.
Figure 16B:
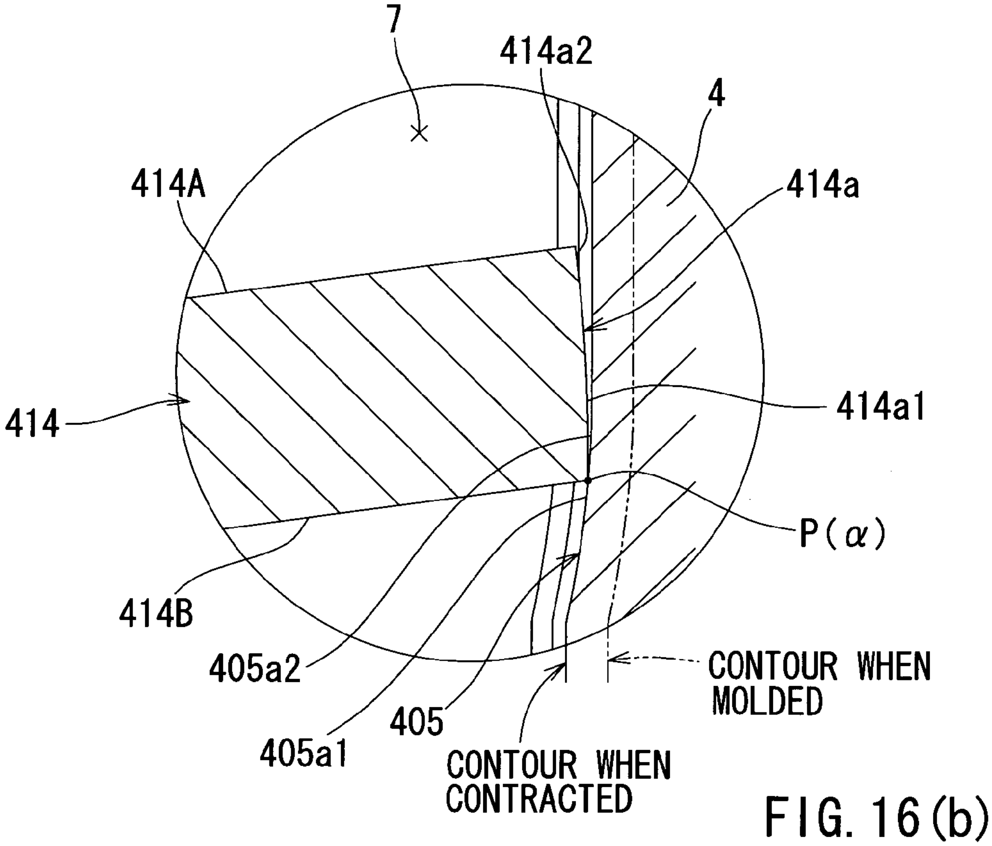
Figure 17A:
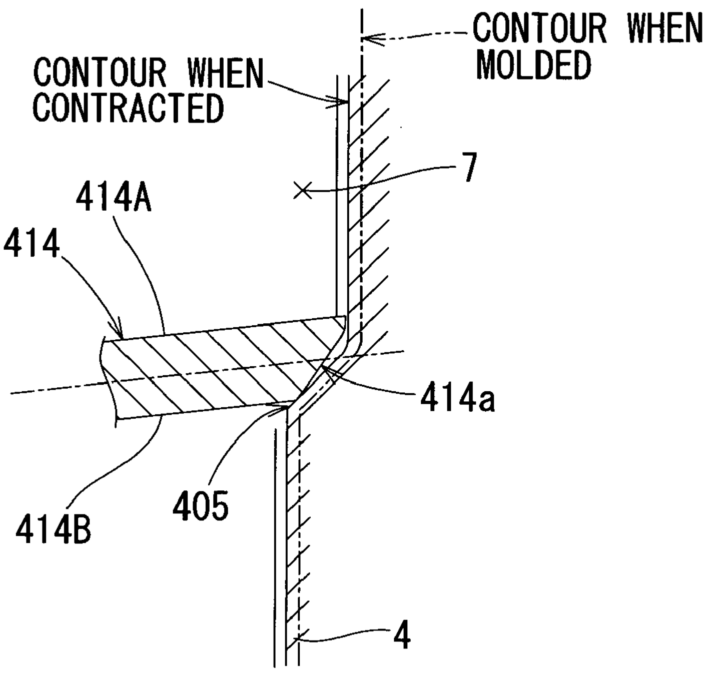
FIG. 17(*a*) is a view similar to FIG. 15(*a*) but showing the state after contraction of the main body.
Figure 17B:
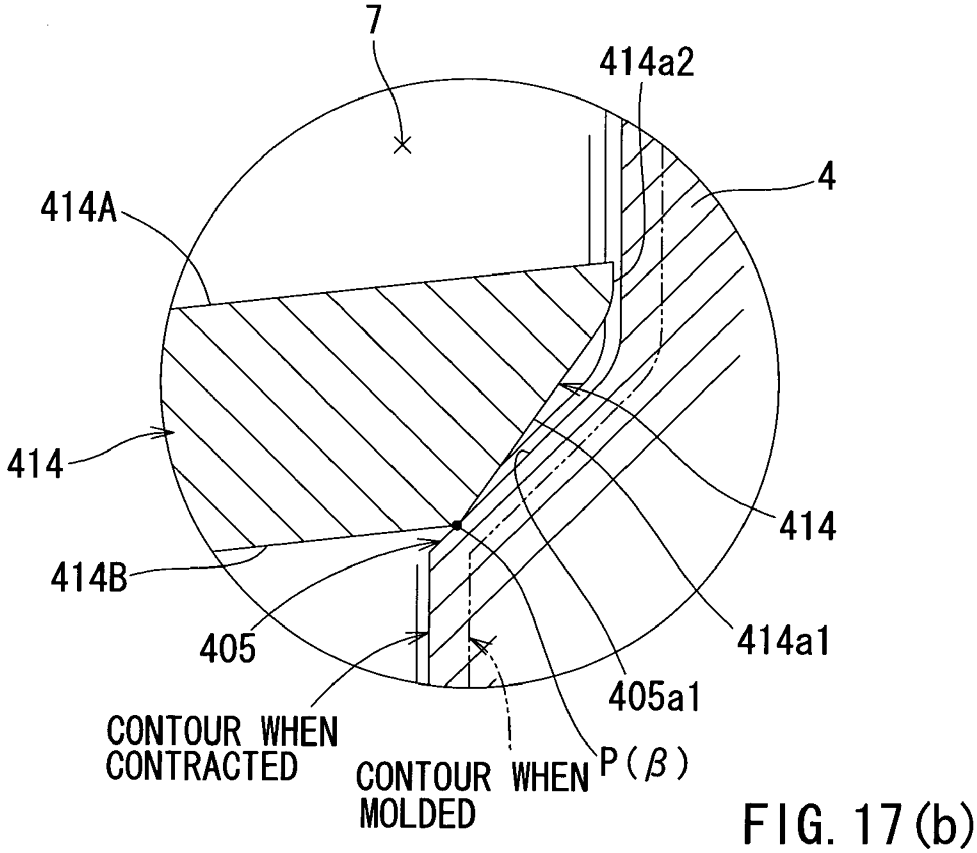

Also with this representative embodiment, the first part **414*a*1 of each of the outer peripheral surfaces 414*a* of the valve member 414 can sealably contact with the first part 405*a*1 of the corresponding valve seal surface 405 along the entire relevant circumferential length as shown in FIGS. 16**(*a*) and 16(*b*), and FIGS. 17(*a*) and 17(*b*). The sealing contact can be accomplished even if the main body 3 has been contracted after the molding process. FIG. 16(*a*) and FIG. 16(*b*) show the relationship between the main body 3 and the valve member 414 at the central point of the peripheral surfaces **414*a* of the valve member 414. FIGS. 17**(*a*) and 17(*b*) show the relationship between the main body 3 and the valve member 414 at the circumferential ends of the peripheral surfaces **414*a***. Therefore, the fifth representative embodiment can attain the same operations and advantages as the first representative embodiment.

In addition, according to this representative embodiment, when the fully closed position of the valve member 414 has been displaced due to the contraction of the main body 3, the edge on the closing side (small diameter side) of the first part **414*a*1 at the central point in the circumferential direction contacts with each valve seal surface 405*a*1 at a point P(α) as shown in FIG. 16**(*b*). In addition, the edge on the closing side (small diameter side) of the first part **414*a*1 at the circumferential ends contacts with each valve seal surface 405*a*1 at a point P(β) as shown in FIG. 17**(*b*). This is accomplished by the determination of the angle θ, in particular the angle θ(α1) shown in FIG. 14(*b*) and the angle θ(β1) shown in FIG. 15(*b*). Thus, the valve member 414 and each valve seal surface **405*a*1 contact with each other along the overall circumferentional length by a linear seal line extending between the point P(α) shown in FIG. 16**(*b*) and the point P(β) shown in FIG. 17(*b*). In this way, the sealing performance in the fully closed position of the valve member 414 can be ensured to reduce or minimize potential leakage of the intake air.

Further, according to the fifth representative embodiment, each of the outer peripheral surfaces **414*a* has a second part 414*a*2 configured as a convex curved surface extending in series with the first part 414*a*1. Therefore, it is possible to reduce the flow rate of the intake air when the open angle of the valve member 414** is within a small opening angle range. A small opening angle range may be an angle between 0° to 7° with the opening angle at a fully closed position being taken as 0°. In other words, it is possible to reduce the ratio of increase of the flow rate of the intake air during the small open angle range.

Figure 20:
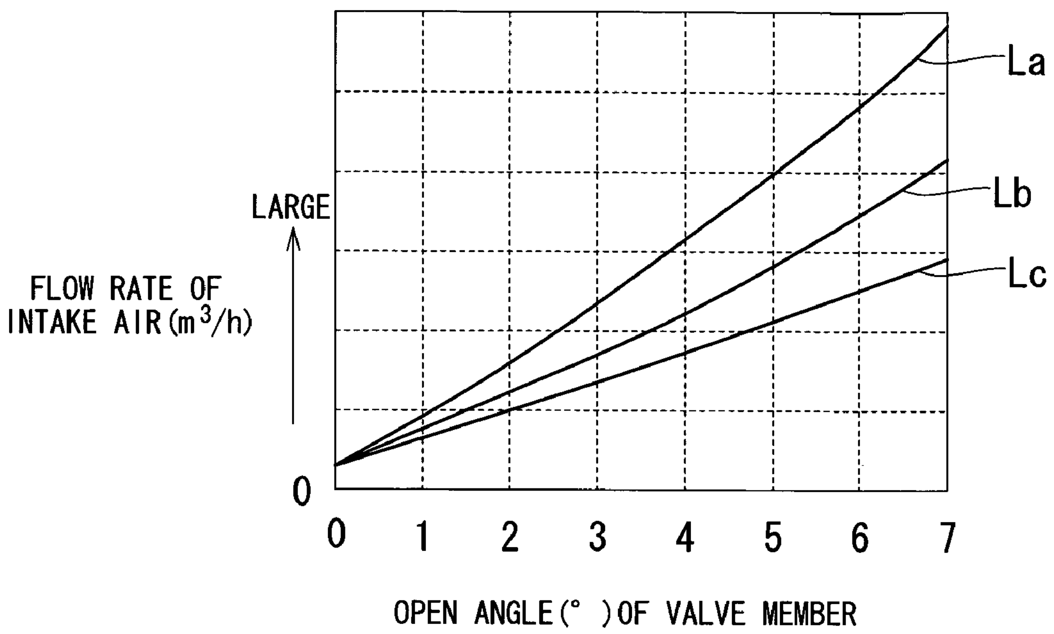
FIG. 20 is a graph showing the relation between an open angle of a valve member and a flow rate of intake air and showing characteristic lines obtained by various representative embodiments.

A characteristic line Lb of the change of the flow rate of the intake air with respect to the change of the opening angle of the valve member 414 is shown in FIG. 20. For the purposes of comparison, a characteristic line La, obtained by the valve member 14 of the first representative embodiment, is also shown in FIG. 20. As will be seen from FIG. 20, during the small opening angle range (0° to 7°), the flow rate of the intake air obtained by the valve member 414 of the fifth representative embodiment is reduced by approximately 30% as compared to the flow rate obtained by the valve member 14 of the first representative embodiment.

Therefore, it is possible to improve the metering accuracy of the intake air during a small opening angle range of the valve member 414. As a result, the performance of the throttle body 2 during the small opening angle range can be improved. In addition, it is possible to lower the rotational speed of the engine during idling operation. As a result, the fuel efficiency during idling operation can be improved. Further, exhaust gas emission can be reduced.

The above construction of the fifth representative embodiment can effectively improve the performance during the small opening angle range in comparison with a construction proposed by Japanese Laid-Open Patent Publication No. 2002-530587.

Figure 27:
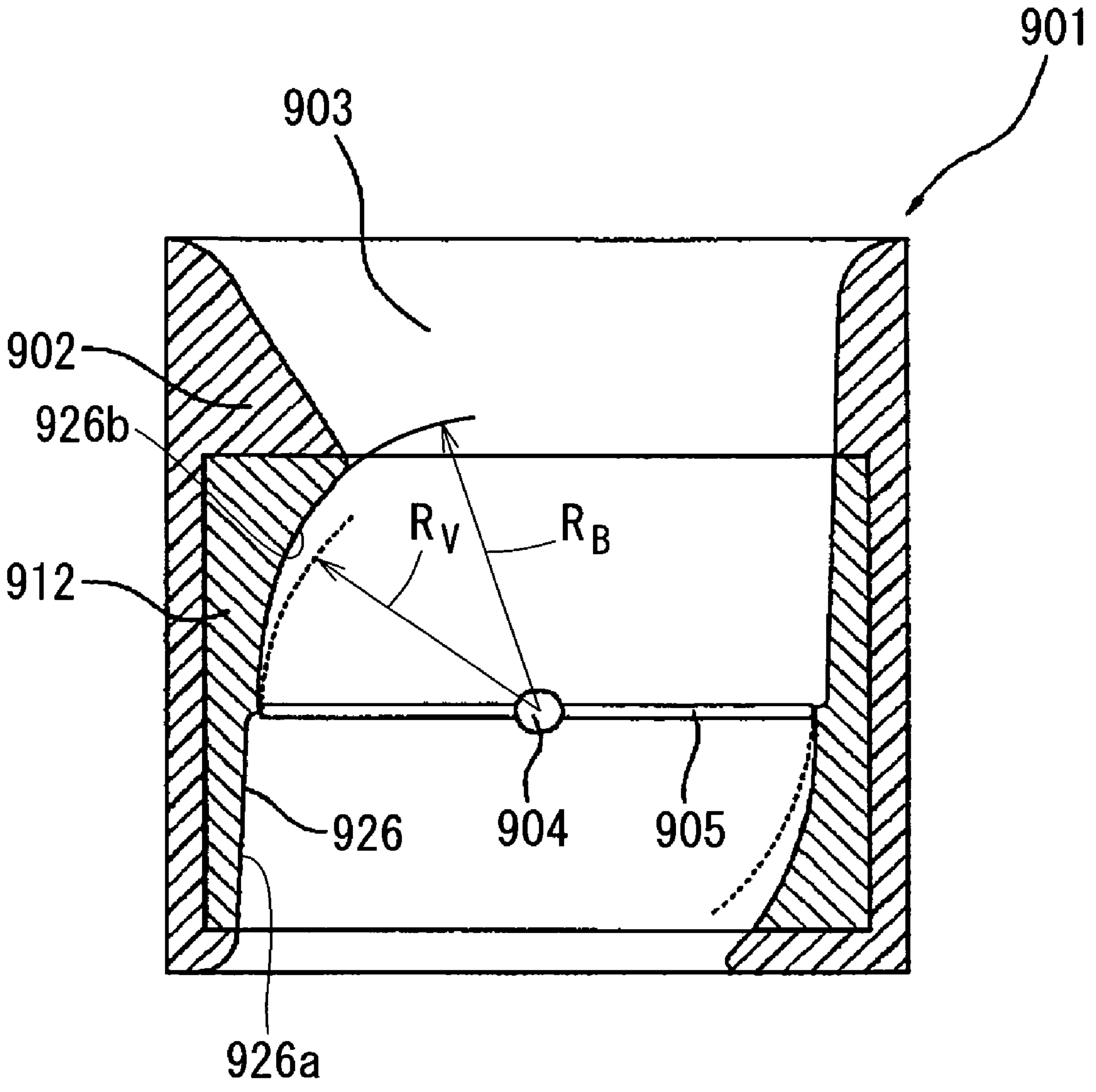
PRIOR ART FIG. 27
FIG. 27 is a cross sectional view of a known throttle body.

As shown in FIG. 27, a throttle body 901 shown in Japanese Laid-Open Patent Publication No. 2002-530587 has a bore wall portion 902 made of resin. An air intake channel 903 is defined within the bore wall portion 902. A valve member 905 is supported by a throttle shaft 904 and is rotatable within the air intake channel 903. A cylindrical member 912, made of metal, is fitted into the bore wall portion 902. The cylindrical member 912 has inner walls 926 that are configured to provide a specific characteristic flow rate of intake air in response to an opening angle of the valve member 905. The inner walls 926 are symmetrical with each other with respect to a point on the rotational axis of the throttle shaft 904. Each of the inner walls 926 has a relatively straight cylindrical section 926*a*, and an arc shaped section 926*b* that are respectively positioned on the valve closing side and the valve opening side with respect to the fully closed position of the valve member 905.

According to this publication, the valve member 905 and the cylindrical member 912 are manufactured separately from each other before they are assembled. Therefore, it is necessary to take into account the tolerances of these parts. Therefore, if the diameter $R_V$ of the valve member 905, and a diameter $R_B$ of the arc shaped section 926*b* of each inner wall 926 of the cylindrical member 912, are set to be equal to each other ($R_V=R_B$), there is a possibility that the valve member 905 interacts with the arc shaped sections 926*b*, potentially causing malfunction of the valve member 905. Therefore, it is necessary to specify the diameters $R_V$ and $R_B$ so as to satisfy the following relationship:

$$R_V<R_B$$

Conversely, according to the fifth representative embodiment, the valve member 414 and the valve seal surfaces 405 can be molded to respectively have a diameter Rv1 and a diameter $R_{B1}$ that is equal to the diameter $R_{V1}$ of the valve seal surfaces 405 (see FIG. 14(*a*)). This can be accomplished by utilizing the insert molding process as described in connection with the first representative embodiment. The main body 3 may be molded using resin while the valve member 414 is inserted into the mold. The valve seal surfaces 405 may consequently have configurations conforming to the configurations of the peripheral surfaces 414*a* of the valve member 414. Therefore, the flow rate of the intake air during the small opening angle range of the valve member 414 may be further reduced because the difference between the diameter $R_{V1}$ and the diameter $R_{B1}$ is minimized.

As a result, the metering accuracy of the intake air during the small opening angle range of the valve member 414 can be further improved. Therefore, the performance of the throttle body 2 during the small opening angle range can be further improved in comparison with the performance of the throttle body of the above publication.

The performance during the small opening angle range can be selectively determined by changing the ratio between the thickness of the first part 414*a*1 and the thickness of the second part 414*a*2. More specifically, the ratio of change of flow rate during the small opening angle range may be decreased as the thickness of the second part 414*a*2 becomes greater than the thickness of the first part 414*a*1. Consequently, the ratio may be changed to further improve the metering accuracy of the intake air during the small opening angle range and to further improve the performance of the throttle body 2 during the small opening angle range. It is advantageous that the second part 414*a*2 is formed on at least the opening side (large diameter side) of the outer peripheral surfaces 414*a*. It is possible that the second part 414*a*2 is formed to extend substantially along the overall thickness of the outer peripheral surfaces 414*a*.

Figure 18:
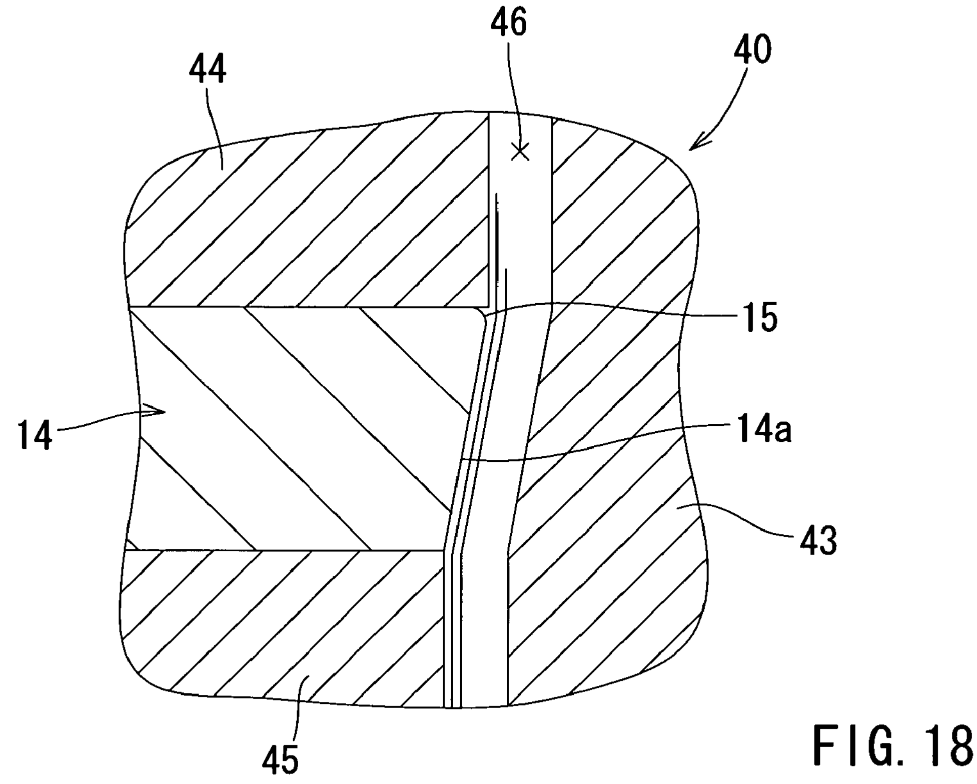
FIG. 18 is an explanatively sectional view of a mold showing a rounded corner portion that may produce burrs when the valve member of the first representative embodiment is molded.

Furthermore, the fifth representative embodiment is advantageous over the first representative embodiment in terms of the manufacturing costs. For example, in the case of the valve member 14 of the first representative embodiment, a possibility may exist that a small rounded corner portion 15 may be formed on the opening side (large diameter side) of the outer peripheral surface 14*a* of the valve member 14, as shown in FIG. 18. This burr may be formed when the valve member 14 is molded via an injection molding process. In FIG. 18, the rounded corner portion 15 is shown in an exaggerate form for the illustration purpose.

If the main body 3 is molded by the body forming mold 40 with the valve member 14 already inserted into the mold 40, as described in connection with the first representative embodiment, the molten resin may flow into a small gap between the upper auxiliary mold part 44 and the rounded corner portion 15 of the valve member 14. Therefore, burrs may be formed on the inner wall of the intake air channel 7 of the molded main body 3. The burrs thus formed may interact with the valve member 14 to potentially cause malfunctioning of the valve member 14 when the valve member 14 is rotated open. For this reason, it would be necessary to remove any burrs after the molding process.

Conversely, according to a fifth representative embodiment, the valve member 414 has the second part 414*a*2 configured as a convex curved surface on the opening side or the large-diameter side of each of the outer peripheral surfaces 414*a* (see FIGS. 14(*b*) and 15(*b*)). Therefore, an angle θt between a tangential line Lt drawn from the upper end of the second part 414*a*2 and a surface 414A on the open side of the valve member 414 can be set to be greater than the corresponding angle between each outer circumferential surface 14*a* and the surface 14A of the valve member 14 of the first representative embodiment. In other words, the angle θt is nearer to 90° than the corresponding angle of the valve member 14. As a result, the valve member 414 can be molded without a rounded corner portion corresponding to the rounded corner portion 15, or at least with a minimum rounded corner portion. It may be understood that such a rounded corner portion becomes smaller as the angle θt increases to nearly 90°.

In this way, according to the fifth representative embodiment, it is possible to eliminate or minimize the production of the rounded corner portion. Therefore, an operation for removing the burrs produced by a rounded corner portion can be eliminated or minimized.

Sixth Representative Embodiment

A sixth representative embodiment will now be described with reference to FIG. 21. The sixth representative embodiment also relates to a modification of the fifth representative embodiment and differs from the sixth representative embodiment in the configurations of the valve member and the valve seal surfaces. In all other respects, the fifth representative embodiment is the same as the first representative embodiment.

Figure 21:
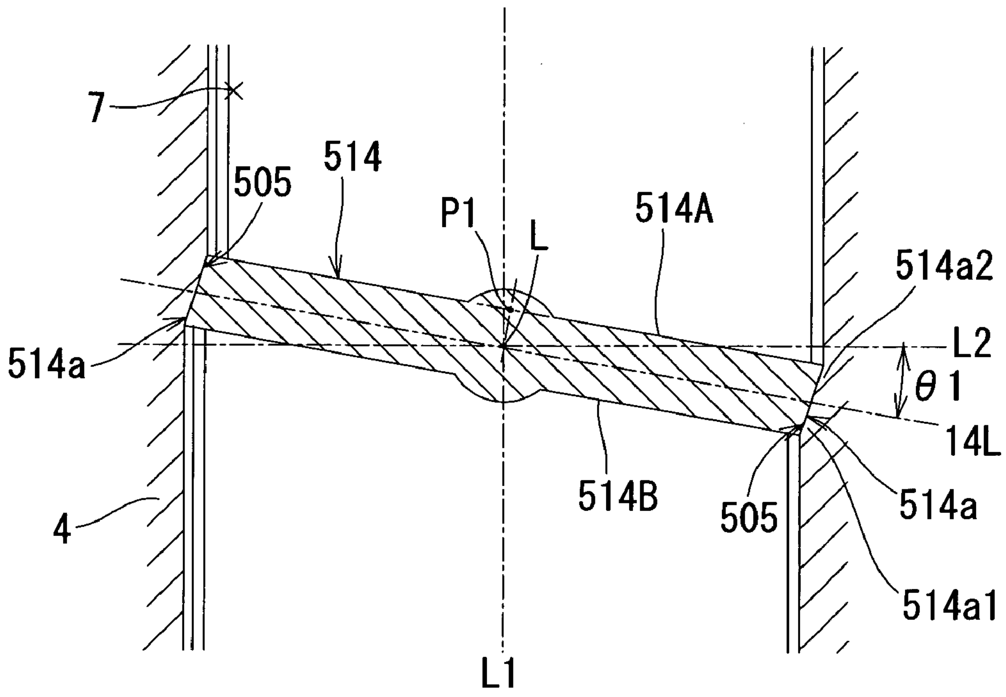
FIG. 21 is a cross sectional view of a throttle body of a throttle control device according to a sixth representative embodiment.

Referring to FIG. 21, a valve member 514 according to the sixth representative embodiment has outer peripheral portions 514*a*, corresponding to the outer peripheral portions 414*a* of the valve member 414 of the fifth representative embodiment. In addition, each of the outer peripheral portions 514*a* has a first part 514*a*1 and a second part 514*a*2 respectively corresponding to the first part 414*a*1 and the second part 414*a*2. Further, the valve member 514 has opposing surfaces 514A and 514B respectively positioned on the valve opening side and the valve closing side. Valve seal surfaces 505 are formed so as to conform to the configurations of the outer peripheral portions 514*a* of the valve member 514.

The valve member 514 is different from the valve member 414 in that the fully closed position is specified as a position displaced from a line L2 by an angle θ1 in the closing direction (clockwise direction as viewed in FIG. 21). The line L2 is perpendicular to the central line L1 of the intake air channel 7. The central line L1 and the line L2 are perpendicular to the rotational axis L of the valve member 514. The angle θ1 is known as "valve set angle." Preferably, the angle θ1 is set within a range between 0° and −5.6°. Here, −5.6° indicates that the angle measured from the line L2 in the closing direction (clockwise direction) is 5.6°.

With this arrangement, the ratio of change of the flow rate of the intake air during the small opening angle range of the valve member 514 can be lowered further than the ratio obtained by the fifth representative embodiment, as indicated by the characteristic line Lc in FIG. 20. In other words, the flow rate of the intake air during the small opening angle range of the valve member 514 may be reduced below the flow rate obtained by the fifth representative embodiment. More specifically, the flow rate of the intake air obtained by the valve member 514 of the sixth representative embodiment is smaller by approximately 30% as compared to the flow rate obtained by the valve member 414 of the fifth representative embodiment.

As a result, there is an improvement in the metering accuracy of the intake air during the small opening angle range of the valve member 514. The performance of the throttle body 2 during the small opening angle range can also be improved to further lower the rotational speed of the engine during an idling operation. As a result, there is an improvement in the fuel efficiency during idling operation. Additionally, there is a further reduction in the emission of exhaust gas.

Although the sixth representative embodiment has been described as a modification of the fifth representative embodiment, the setting of the fully closed position to a position displaced from a line L2 by the angle θ1 (i.e., the valve set angle) can also be applied to the first representative embodiment.

Seventh Representative Embodiment

A seventh representative embodiment will now be described with reference to FIG. 22. The seventh representative embodiment also relates to a modification of the fifth representative embodiment and is different from the sixth representative embodiment in the configurations of the valve member and the valve seal surfaces. In other respect, the seventh representative embodiment is the same as the fifth representative embodiment.

Figure 22:
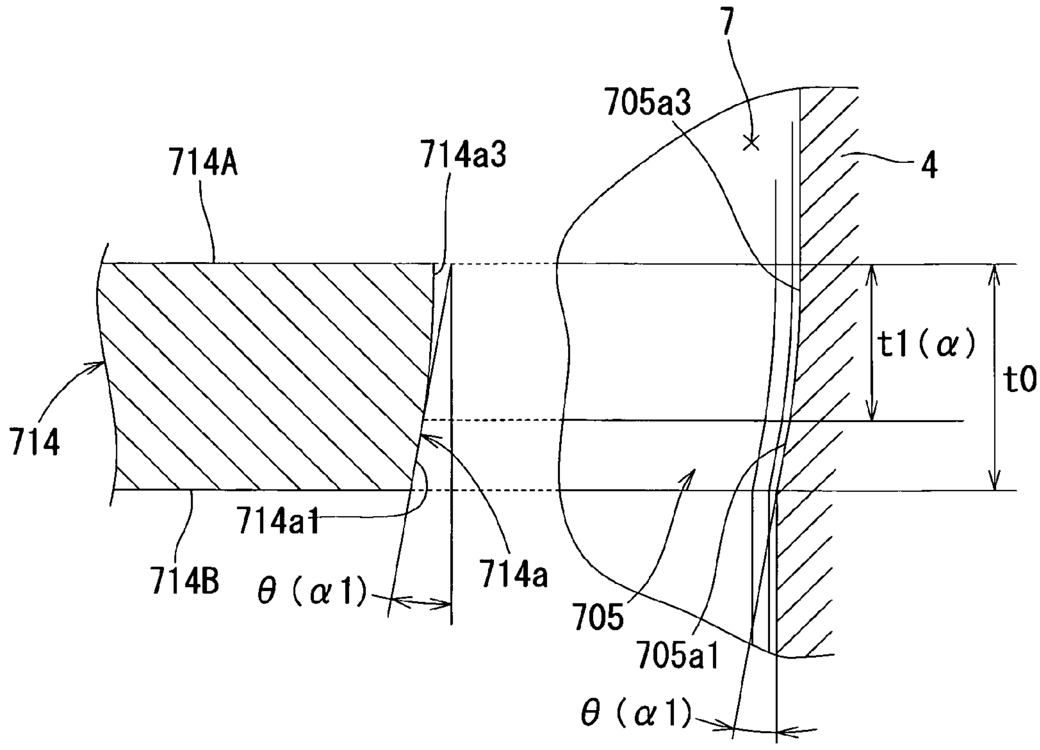
FIG. 22 is an exploded sectional view showing the relation between outer peripheral surfaces and valve seal surfaces of a main body of a throttle control device according to a seventh representative embodiment.

Referring to FIG. 22, a valve member 714 of the seventh representative embodiment has outer peripheral surfaces 714*a* (only one outer peripheral surface 714*a* is shown in FIG. 22) each having a first part 714*a*1 and a second part 714*a*3 corresponding to the first part 414*a*1 and the second part 414*a*2 of the fifth representative embodiment. Also, the valve member 714 has opposing surfaces 714A and 714B. The valve member 714 is different from the valve member 414 of the fifth representative embodiment in the configuration in cross section of the second part 714*a*3. Thus, the second part 714*a*3 is configured to have a cross sectional configuration corresponding to as a part of an oval or ellipse that smoothly continue with the first part 714*a*1. In this connection, a valve seal surface 705 has a first part 705*a*1 and a second part 705*a*3, which respectively conform to the first part 714*a*1 and the second part 714*a*2 of the valve member 714. Also with this configuration, the same operation and advantages as the fifth representative embodiment can be attained.

In addition, although the second part 714*a*3 is configured to have a cross section corresponding to a part of an oval or ellipse in the seventh representative embodiment, the second part may have various cross sectional configurations other than a part of a circle and a part of an oval or ellipse. For example, the cross section of the second part may correspond to a part of an involute curve or any other two-dimensional curve, or a combination of these curves and a combination of any of these curves and the oval or ellipse, as long as the cross sectional configuration is similar to an arc. Otherwise, the second part may have a three-dimensional curved configuration. Further, the valve set angle θ1 described in connection with the sixth representative embodiment can also be applied to the seventh representative embodiment.

Eighth Representative Embodiment

An eighth representative embodiment will now be described with reference to FIG. 23. The eighth representative embodiment also relates to a modification of the fifth representative embodiment and is different from the sixth representative embodiment in the configurations of the valve member and the valve seal surfaces. In other respect, the eighth representative embodiment is the same as the fifth representative embodiment.

Figure 23:
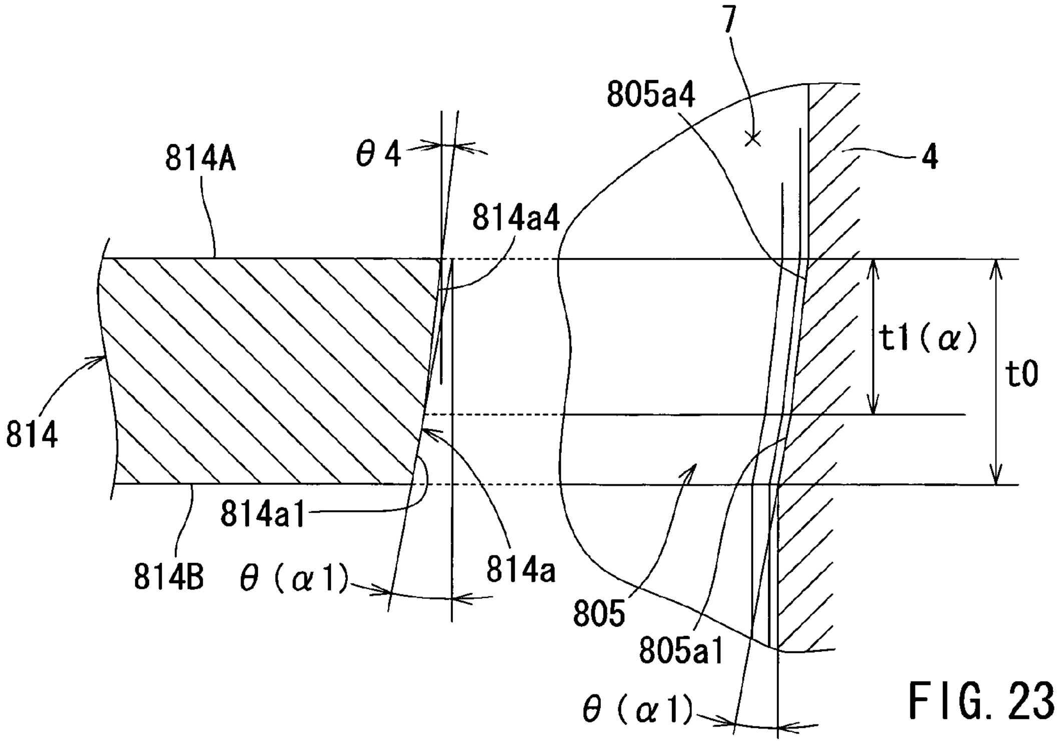
FIG. 23 is an exploded sectional view showing the relation between outer peripheral surfaces and valve seal surfaces of a main body of a throttle control device according to an eighth representative embodiment.

Referring to FIG. 23, a valve member 814 of the eight representative embodiment has outer peripheral surfaces 814*a* (only one outer peripheral surface 814*a* is shown in FIG. 23) each having a first part 814*a*1 and a second part 814*a*4 corresponding to the first part 414*a*1 and the second part 414*a*2 of the fifth representative embodiment. Also, the valve member 814 has opposing surfaces 814A and 814B. The valve member 814 is different from the valve member 414 of the fifth representative embodiment in the configuration in cross section of the second part 814*a*4. Thus, the second part 814*a*4 is configured to extend along a straight line in cross section and smoothly continues with the first part 814*a*1. More specifically, the second part 814*a*4 is inclined relative to the central line L1 by an angle θ4. The angle θ4 is set to be smaller than the angle θ(α1) of the first part 814*a*1 relative to the central line L1. In this connection, a valve seal surface 805 has a first part 805*a*1 and a second part 805*a*4, which respectively conform to the first part 814*a*1 and the second part 814*a*4 of the valve member 814. Also with this arrangement, substantially the same operations and advantages can be accomplished.

Although the eighth representative embodiment has been described in connection with the outer peripheral surfaces 814*a* of the valve member 814 and the valve seal surfaces 805 having the first and second parts 814*a*1 and 814*a*4 (805*a*1 and 805*a*4) each having a straight configuration in cross section, the outer peripheral surfaces of the valve member and the valve seal surfaces may have three or more straight parts having different inclination angles from each other. Otherwise, a combination of the straight parts and at least one curved part, such as an oval or elliptical part can be used. Further, the valve set angle θ1 described in connection with the sixth representative embodiment can also be applied to the eighth representative embodiment.

(Possible Alternative Arrangements of First to Sixth Representative Embodiments)

The first to sixth representative embodiments have been described in connection with the method of manufacturing the throttle body 2 or the throttle control device 1. The methods of manufacturing include the insert molding process, in which the main body 3 is molded with the valve member previously inserted into the mold 40. However, it is possible to manufacture the throttle body 2 or the throttle control device 1 using an alternative manufacturing method that includes a modified insertion molding process. In the alternative manufacturing method, the valve member is molded with a main body 3 previously inserted into a mold. In addition, although the main body 3 may contract (or be constricted) after the insertion molding process according to the alternative manufacturing method, the arrangement of the outer peripheral surfaces (or the contact surfaces) of the valve member and the valve seal surfaces of the first to sixth representative embodiments can maintain or create a seal between the outer peripheral surfaces (or the contact surfaces) and the valve seal surfaces in a fully closed position of the valve member as will be hereinafter described.

The alternative method of manufacturing the throttle body 2 will now be described in connection with the method of manufacturing the throttle body 2 of the first representative embodiment. The method includes a body molding process and a valve molding process.

Figure 24:
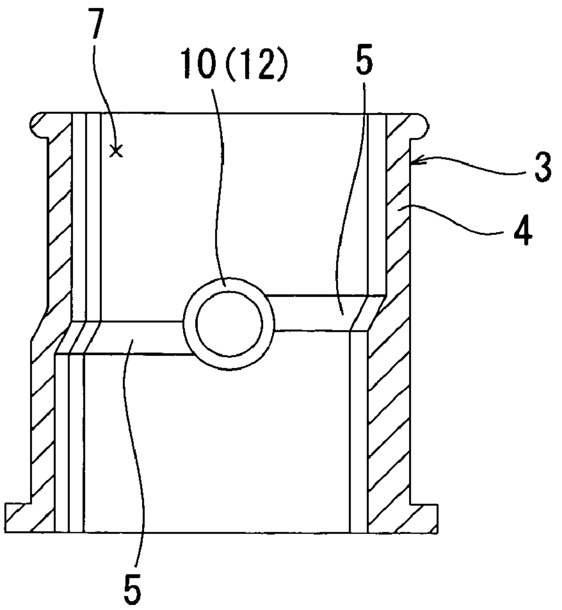
FIG. 24 is a vertical sectional view of the main body of the first representative embodiment, which is molded by a body molding process of an alternative method of manufacturing the throttle body.

In the body molding process, the main body 3 is molded by resin as shown in FIG. 24 through an injection molding process utilizing a body forming mold (not shown). As described in connection with the first representative embodiment, the valve seal surfaces 5 for contacting with the outer peripheral surfaces 14*a* of the valve member in the fully closed position may be formed on the inner wall of the bore wall portion 4 of the main body 3.

Figure 25:
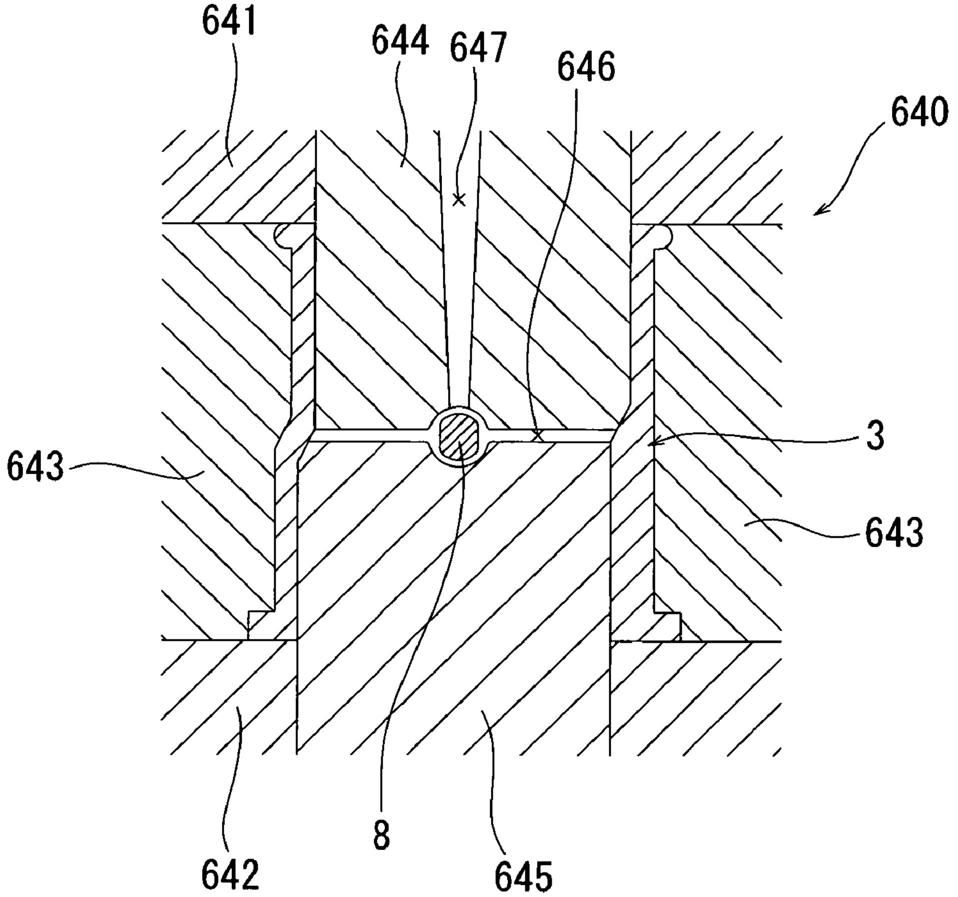
FIG. 25 is a vertical sectional view of a valve forming mold used in the alternative method.

Next, in the valve molding process, the main body 3 is inserted into a valve forming mold 640 shown in FIG. 25. The valve member 14 (see FIG. 3) is then molded using resin via an injection molding process. More specifically, the valve forming mold 640 has an upper main mold part 641, a lower main mold part 642, a plurality of side mold parts 643, an upper auxiliary mold part 644, and a lower auxiliary mold part 645. The upper and lower auxiliary mold parts 644 and 645 are adapted to be inserted into the bore wall portion 4 of the main body 3 in order to define a cavity 646 corresponding to the configuration of the valve member 14 in a fully closed position therebetween. A molten resin filling port 647 is defined within the upper auxiliary mold part 644 and communicates with the cavity 646, so that the molten resin can be injected into the cavity 646 via the filling port 647 from the upper side of the upper auxiliary mold part 644.

In order to mold the valve member 14, the main body 3 is inserted into the mold 640. In addition, the throttle shaft 8, with the metal bearings 10 and 12 attached thereto, is inserted into the cavity 646. The mold parts 641 to 645 are then closed. Thereafter, the molten resin is injected into the cavity 646 defined within the closed mold 640.

After the injected resin within the cavity 646 has cooled to form the valve member 14, the mold parts 641 to 645 may be moved so as to open the mold 640 and release the molded product (i.e., the throttle body 2 having the valve member 14, the throttle shaft 8 and the metal bearings 10 and 12) from the mold 640. As shown in FIG. 25, the valve seal surfaces 5 of the main body 3 are exposed to the cavity 646 so as to define wall parts of the cavity 646. The outer peripheral portions 14*a* of the valve member 14 can be directly configured by the valve seal surfaces 5 of the main body 3.

After the throttle body 2 has been manufactured as described above, the plug 16, the seal member 17, back spring 19, the motor 20, the reduction gear mechanism 29, and the cover 30 are mounted to the throttle body 2. Mounting of the various components completes the throttle control device 1 shown in FIG. 2.

Figure 26A:
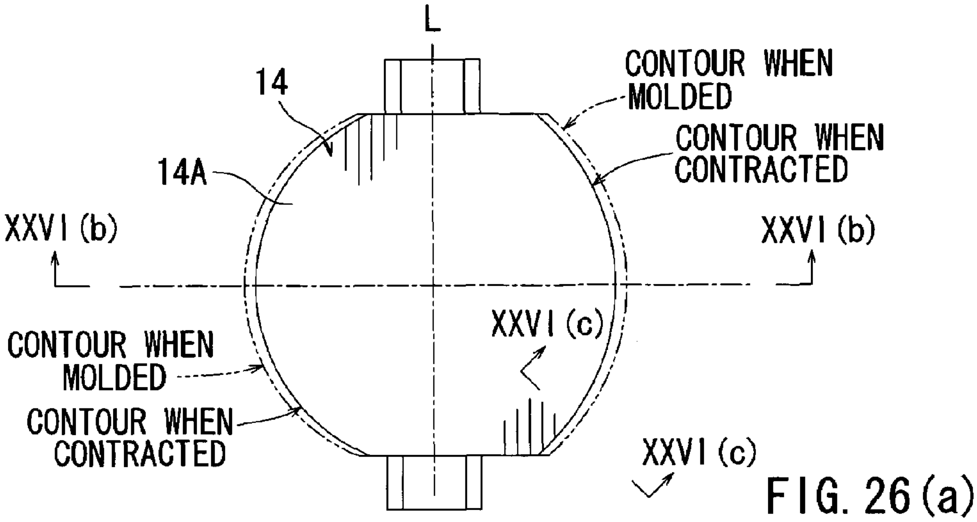
FIG. 26(*a*) is a plan view of the valve member of the first representative embodiment, which is molded according to the alternative method, and showing the configuration before and after contraction.
Figure 26B:
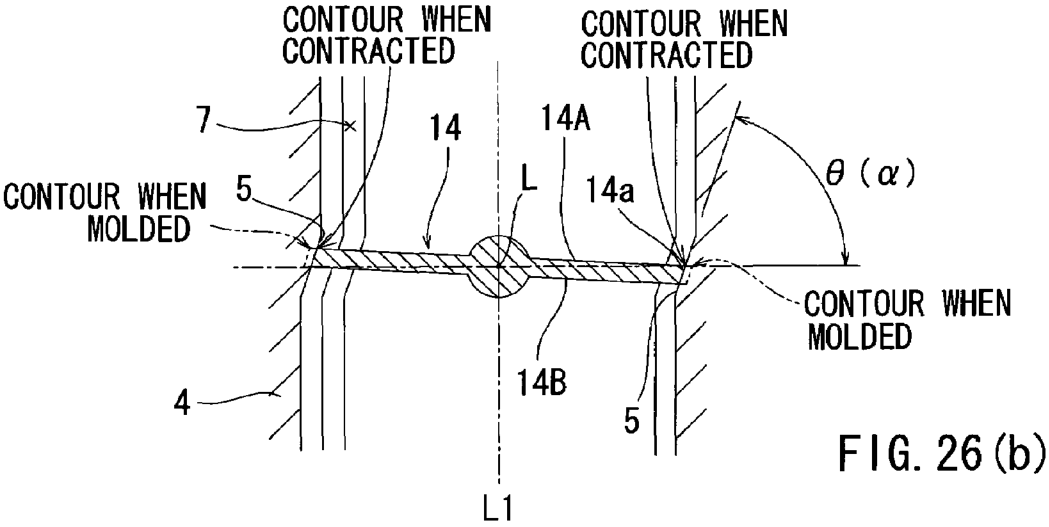
Figure 26C:
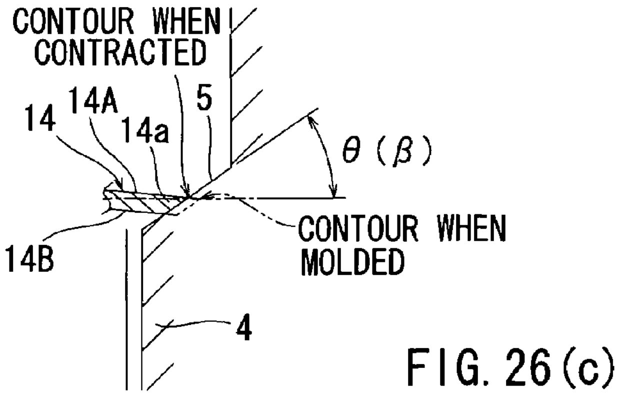

When the molded valve member 14 is cooled, the valve member 14 may contract. Assuming that the valve member 14 will contract so as to uniformly reduce the diameter of the outer peripheral surfaces 14*a* by a predetermined length with respect to the circumferential direction as shown in FIG. 26(*a*), the fully closed position of the valve member 14 may be displaced by a certain angle in a closing direction away from the original fully closed position prior to the contraction of the valve member 14. However, the most remote point (from the rotational axis L) of each peripheral surfaces 14*a* can still closely contact (in point contact) with the corresponding valve seal surfaces 5, as shown in FIG. 26(*b*). In addition, the circumferential ends of each peripheral surfaces 14*a* can also still closely contact (in point contact) with the corresponding valve seal surfaces 5 as shown in FIG. 26(*c*). In this way, each peripheral surface 14*a* can closely contact (in line contact) with the corresponding valve seal surfaces 5 along the entire relevant circumferential length without producing any significant clearance with respect to the valve seal surface 5. As a result, it is possible to prevent or minimize potential leakage of the intake air from a clearance between the main body 3 and the valve member 14, even if the fully closed position of the valve member 14 has been displaced due to the contraction of the valve member 14.

Although the alternative manufacturing method has been described in connection with the throttle body of the first representative embodiment, the same method can also be used to manufacture the throttle bodies of the second to sixth representative embodiments. In addition, it is also possible to prevent or minimize the potential leakage of intake air, from a clearance between the main body 3 and the valve member, of each of the second to sixth representative embodiments, even if the fully closed position of the valve member has been displaced due to the contraction of the valve member.

Further, the above representative embodiments have been described in connection with throttle bodies having a main body with a pair of symmetrical valve seal surfaces and a throttle valve with a pair of symmetrical outer peripheral surfaces or contact surfaces. Therefore, the bore wall portion 4 of the main body 3 may contract so as to uniformly reduce the diameter by a predetermined length with respect to the circumferential direction. However, the present invention may not be limited to these throttle bodies.

For example, although the valve seal surfaces 5 (or the outer peripheral surfaces 14*a*) are symmetrical with each other with respect to a point on the rotational axis L of the throttle shaft 9, the valve seal surfaces 5 as well as the outer peripheral surfaces 14*a* may have conjurations that are not symmetrical. Thus, if the bore wall portion 4 of the main body 4 does not have a circular cross section, the bore wall portion 4 may contract not to uniformly reduce the diameter with respect to the circumferential direction. Therefore, the valve seal surfaces 5 as well as the outer peripheral surfaces 14*a* may be molded to have configurations to correspond to the contracted configuration of the bore wall portion 4.

The invention claimed is:

1. A throttle body comprising:

a main body defining an intake air channel;

a valve member rotatably mounted to the main body comprising;

a rotation axis;

an open position permitting a flow of air in the intake air channel;

a fully closed position restricting the flow of air in the intake air channel;

an outer peripheral surface formed between an upstream side surface and a downstream side surface of the valve member with respect to the valve member in the fully closed position;

a contact surface formed on the outer peripheral surface;

a valve seal surface formed on the inner wall of the intake air channel and having a circumferential length so as to sealingly contact the corresponding contact surface when the valve member is in the fully closed position; and wherein the intake air channel has a central axis; and wherein the valve seal surface and the corresponding contact surface of the valve member in the fully closed position are inclined by an angle relative to a first plane extending substantially perpendicular to the central axis of the intake air channel; and wherein the angle of inclination of the valve seal surface and the corresponding contact surface gradually decreases from a first point located on a circumference of the outer peripheral surface resulting from a line perpendicular to an intersection of the central axis and the rotation axis, defined as the most remote from the central axis of the intake air channel, to a second point located on the circumference of the outer peripheral surface that is proximate to the rotation axis.

2. The throttle body as in claim 1, wherein the valve seal surface and the contact surface extend along a linear line as viewed in a cross section within a second plane that includes the central axis of the intake air channel.

3. The throttle body as in claim 2, wherein the outer peripheral surface comprises;

a first part positioned on a side of the valve member in a valve closing direction; and a second part positioned on a side of the valve member in a valve opening direction;

wherein the first part comprises the contact surface.

4. The throttle body as in claim 3, wherein the valve seal surface is configured to conform to the configuration of the first part of the valve member.

5. The throttle body as in claim 3, wherein the second part of the valve member is configured so as clear the inner wall of the main body during the movement of the valve member away from the fully closed position.

6. The throttle body as in claim 5, wherein the second part has a curved configuration as viewed in cross section within the second plane, and wherein the second part is continuously formed with the first part.

7. The throttle body as in claim 6, wherein the second part includes:

an arc-shaped configuration, and a radius of curvature defining the arc-shaped configuration.

8. The throttle body as in claim 7, wherein the arc-shaped configuration of the second part has a first radius of curvature at the first point, and a second radius of curvature at the second point.

9. The throttle body as in claim 8, wherein the first radius of curvature is larger than the second radius of curvature.

10. The throttle body as in claim 9, wherein the radius of curvature of the second part gradually decreases from the first radius of curvature at the first point to the second radius of curvature at the second point in the circumferential direction of the outer peripheral surface of the valve member.

11. The throttle body as in claim 10, wherein the second part has a length in a direction of thickness of the valve member, and wherein the length is a first length at the first point and a second length at the second point, and wherein the first length is greater than the second length.

12. The throttle body as in claim 11, wherein the length gradually decreases from the first length at the first point to the second length at the second point in the circumferential direction.

13. The throttle body as in claim 1, wherein the fully closed position is set in a position where the valve member is rotated in a valve closing direction beyond a first plane extending substantially perpendicular to the central axis of the intake air channel.

14. A method of manufacturing a throttle body as in claim 1, comprising:

molding a valve member using a resin material;

inserting the molded valve member into a mold, wherein the mold cooperates with the valve member to define a cavity conforming to a configuration of a main body of the throttle body; and injecting resin into the mold and molding the main body, so that the valve seal surface is molded to conform to the contact surface of the valve member.

15. The method as in claim 14, wherein the valve member is molded integrally with a throttle shaft;

and further comprising the steps of:

attaching metal bearings to the throttle shaft, so that the molded valve member is inserted into the mold together with the throttle shaft and the metal bearings.

16. A method of manufacturing a throttle body as in claim 1, comprising:

molding a main body of the throttle body using a resin material;

inserting the molded main body into a mold, wherein the mold cooperates with the main body to define a cavity conforming to a configuration of a valve member; and injecting resin into the mold and molding the valve member, so that the contact surface is molded to conform to the valve seal surface of the main body.

17. The method as in claim 16, further comprising the step of:

inserting a throttle shaft and metal bearings attached to the throttle valve into the mold, so that the valve member is molded integrally with the throttle shaft and the metal bearings.

18. A throttle body comprising:

a main body defining an intake air channel;

a valve member rotatably mounted to the main body via a rotation axis in order to control the flow of intake air through the intake air channel;

a pair of valve seal surfaces formed on an inner wall of the main body and having a circumferential length; and a pair of contact surface formed on the valve member in order to sealingly contact with the corresponding valve seal surfaces when the valve member is in a fully closed position;

wherein the intake air channel has a central axis; and wherein each of the valve seal surfaces and the corresponding contact surface of the valve member in the fully closed position are inclined by an angle relative to a first plane extending substantially perpendicular to the central axis of the intake air channel; and wherein the angle of inclination of each of the valve seal surfaces and the corresponding contact surface gradually decreases from a first point located on a circumference of the valve member resulting from a line perpendicular to an intersection of the central axis and the rotation axis, defined as the most remote from the central axis of the intake air channel, to a second point that is proximate to the rotation axis.

19. The throttle body as in claim 18, wherein one of the pair of valve seal surfaces and corresponding contact surface is displaced from an other of the pair of valve seal surfaces and corresponding contact surfaces along the central axis.

20. The throttle body as in claim 18, wherein the valve member further comprises:

a first valve side surface, and a second valve side surface;

the pair of contact surfaces comprises:

a first valve contact surface, and a second valve contact surface;

the first valve contact surface is partially bounded by the following:

a first radius extending within a plane formed by the first valve side surface and comprising the following:

a first radius origin located on a line within the plane formed by the first valve side surface, which line is parallel to the line perpendicular to the central axis and extending from the intersection of the central axis and the rotation axis, and a first radius length;

a second radius extending within a plane formed by the second valve side surface and comprising the following:

a second radius origin located on a line within the plane formed by the second valve side surface, which line is parallel to the line perpendicular to the central axis and extending from the intersection of the central axis and the rotation axis, and a second radius length;

wherein the first radius length is not equal to the second radius length, wherein a longer one of the first radius length and the second radius length describes a radially outermost perimeter of the first valve contact surface with respect to a direction parallel to the central axis, wherein the second valve contact surface is symmetrical to the first valve contact surface through the point corresponding to the intersection of the central axis and the rotation axis, wherein each of the pair of valve seal surfaces is configured to respectively conform to the corresponding one of the pair of contact surfaces.

21. A throttle body comprising:

a main body defining an intake air channel;

a valve member rotatably mounted to the main body in order to control the flow of intake air through the intake air channel;

a pair of valve seal surfaces formed on an inner wall of the main body and having a circumferential length; and a pair of contact surface formed on the valve member in order to sealingly contact with the corresponding valve seal surfaces when the valve member is in a fully closed position;

wherein the intake air channel has a central axis; and wherein each of the contact surfaces and the corresponding valve seal surface of the main body extend along a first plane extending substantially perpendicular to the central axis of the intake air channel when the valve member is in the fully closed position.

22. The throttle body as in claim 21, wherein one of the pair of valve seal surfaces and corresponding contact surface is displaced from an other of the pair of valve seal surfaces and corresponding contact surfaces along the central axis.

* * * * *